United States Patent
Damnjanovic et al.

(10) Patent No.: US 11,856,210 B2
(45) Date of Patent: Dec. 26, 2023

(54) APPARATUSES, METHODS, COMPUTER PROGRAMS AND COMPUTER-READABLE MEDIA

(71) Applicant: V-NOVA INTERNATIONAL LIMITED, London (GB)

(72) Inventors: Ivan Damnjanovic, London (GB); Gaurav Mittal, London (GB)

(73) Assignee: V-NOVA INTERNATIONAL LIMITED

(*) Notice: Subject to any disclaimer, the term of this patent is extended or adjusted under 35 U.S.C. 154(b) by 198 days.

(21) Appl. No.: 17/342,792

(22) Filed: Jun. 9, 2021

(65) Prior Publication Data

US 2022/0070478 A1     Mar. 3, 2022

Related U.S. Application Data

(63) Continuation of application No. 16/252,357, filed on Jan. 18, 2019, now Pat. No. 11,039,154, which is a
(Continued)

(30) Foreign Application Priority Data

Jul. 20, 2016   (GB) .................................. 1612583

(51) Int. Cl.
*H04N 19/30*     (2014.01)
*H04N 19/122*    (2014.01)
(Continued)

(52) U.S. Cl.
CPC ............. *H04N 19/30* (2014.11); *H04N 19/12* (2014.11); *H04N 19/122* (2014.11);
(Continued)

(58) Field of Classification Search
CPC .... H04N 19/12; H04N 19/122; H04N 19/132; H04N 19/136; H04N 19/146;
(Continued)

(56) References Cited

U.S. PATENT DOCUMENTS

2006/0233254 A1   10/2006   Lee et al.
2007/0223582 A1*   9/2007   Borer .................. H04N 19/521
                                                       375/E7.137
(Continued)

FOREIGN PATENT DOCUMENTS

GB     2133949         8/1984
GB     2133949 A  *    8/1984   ........... H04N 11/004
(Continued)

OTHER PUBLICATIONS

European Examination Report for EP 17752417.0 dated Oct. 12, 2020.
(Continued)

*Primary Examiner* — Kathleen M Walsh
(74) *Attorney, Agent, or Firm* — WORKMAN NYDEGGER

(57) ABSTRACT

A set of reconstruction elements useable to reconstruct a representation of a signal at a relatively high level of quality using data based on a representation of the signal at a relatively low level of quality is obtained. The representation at the relatively high level of quality is arranged as an array comprising at least first and second rows of signal elements. A reconstruction element is associated with a respective signal element in the set. A set of data elements is derived based on the set of reconstruction elements. At least one of the data elements is derived from at least two reconstruction elements associated with signal elements from the first row and a different number of reconstruction elements associated with signal elements from the second row.

16 Claims, 11 Drawing Sheets

Related U.S. Application Data continuation of application No. PCT/GB2017/052141, filed on Jul. 20, 2017.

(51) Int. Cl.
*H04N 19/146* (2014.01)
*H04N 19/18* (2014.01)
*H04N 19/136* (2014.01)
*H04N 19/12* (2014.01)
*H04N 19/16* (2014.01)
*H04N 19/33* (2014.01)
*H04N 19/176* (2014.01)
*H04N 19/132* (2014.01)

(52) U.S. Cl.
CPC ......... *H04N 19/132* (2014.11); *H04N 19/136* (2014.11); *H04N 19/146* (2014.11); *H04N 19/16* (2014.11); *H04N 19/176* (2014.11); *H04N 19/18* (2014.11); *H04N 19/33* (2014.11)

(58) Field of Classification Search
CPC ...... H04N 19/16; H04N 19/176; H04N 19/18; H04N 19/30; H04N 19/33
USPC ..................................................... 375/240.02
See application file for complete search history.

(56) References Cited

U.S. PATENT DOCUMENTS

| | | |
|---|---|---|
| 2008/0247462 A1 | 10/2008 | Demos |
| 2009/0238279 A1 | 9/2009 | Tu et al. |
| 2012/0063512 A1 | 3/2012 | Han et al. |
| 2013/0294495 A1* | 11/2013 | Rossato ................. H04N 19/46 375/E7.026 |
| 2013/0314496 A1* | 11/2013 | Rossato ................. H04N 19/50 375/240.03 |
| 2014/0064386 A1* | 3/2014 | Chen ..................... H04N 19/30 375/240.29 |

FOREIGN PATENT DOCUMENTS

| | | | |
|---|---|---|---|
| WO | 2013-171173 | 11/2013 | |
| WO | WO-2013171173 A1 * | 11/2013 | ............. G06T 7/248 |

OTHER PUBLICATIONS

Dragotti et al., "Discrete directional wavelet bases for image compression", Visual Communications and Image Processing, Aug. 7, 2003-Nov. 7, 2003, Lugano, Jul. 8, 2003, XP030080746.

Fatih et al., "Directional wavelet transforms for prediction residuals in video coding", Image processing (ICIP), 2009 16$^{th}$ IEEE International Conference on, IEEE, Piscataway, NJ, USA, Nov. 7, 2009, pp. 613-616, XP031628521, ISBN: 978-1-4244-5653-6.

GB Search Report dated Jan. 17, 2017 for Application No. GB1612583.3.

International Search Report and Written Opinion dated Nov. 6, 2017 for PCT Application No. PCT/GB2017/052141.

U.S. Appl. No. 16/252,357, Aug. 24, 2020, Office Action.

U.S. Appl. No. 16/252,357, Feb. 8, 2021, Notice of Allowance.

\* cited by examiner

APPARATUSES, METHODS, COMPUTER PROGRAMS AND COMPUTER-READABLE MEDIA

CROSS-REFERENCE TO RELATED APPLICATIONS

This application is a continuation of U.S. patent application Ser. No. 16/252,357, filed Jan. 18, 2019, which is a continuation of International Patent Application No. PCT/GB2017/052141, filed Jul. 20, 2017, which claims priority to UK Patent Application No. GB1612583.3, filed Jul. 20, 2016, under 35 U.S.C. § 119(a). Each of the above-referenced patent applications is incorporated by reference herein in its entirety.

BACKGROUND OF THE INVENTION

1. Field of the Invention

The present invention relates to apparatuses, methods, computer programs and computer-readable media. In particular, the present invention relates to apparatuses, methods, computer programs and computer-readable media for processing data. Processing data may include, but is not limited to, obtaining, deriving, outputting, receiving and reconstructing data.

2. Description of the Related Technology

Compression and decompression of signals is an important consideration in many known systems.

Many types of signal, for example video, audio or volumetric signals, may be compressed and encoded for transmission, for example over a data communications network. Other signals may be stored in a compressed form, for example on a storage medium such as a Digital Versatile Disc (DVD). When such a signal is decoded, it may be desired to increase a level of quality of the signal and/or recover as much of the information contained in the original signal as possible.

Some known systems exploit spatial and temporal correlation within a signal to achieve high compression rates. For example, part of a signal at a given point in time may be compared to part of a reference signal known to both an encoder and a decoder, and differences between the part of the signal and the part of the reference signal may then be stored or transmitted. This is the case, for example, in Moving Pictures Expert Group (MPEG) compression techniques.

Some known systems exploit scalable encoding techniques. Scalable encoding involves encoding a signal along with information to allow the reconstruction of the signal at different levels of quality, depending on the capabilities of the decoder and the available bandwidth. However, relatively large amounts of information may need to be stored and/or transmitted, particularly as the usage of higher quality, higher definition video becomes more widespread.

SUMMARY

According to a first aspect of the present invention, there is provided an apparatus configured to: obtain a set of reconstruction elements, the set of reconstruction elements being useable to reconstruct a representation of a signal at a relatively high level of quality using data based on a representation of the signal at a relatively low level of quality, the representation of the signal at the relatively high level of quality being arranged as an array of signal elements comprising at least first and second rows of signal elements, wherein a reconstruction element in the set of reconstruction elements is associated with a respective signal element in the representation of the signal at the relatively high level of quality; derive a set of data elements based on the set of reconstruction elements, at least one data element in the set of data elements being derived from a plurality of reconstruction elements in the set of reconstruction elements; and output data useable to derive: the representation of the signal at the relatively low level of quality; and the set of data elements, wherein at least one data element in the set of data elements is derived from: at least two reconstruction elements associated with signal elements from the first row of signal elements in the representation of the signal at the relatively high level of quality; and a different number of reconstruction elements associated with signal elements from the second row of signal elements in the representation of the signal at the relatively high level of quality.

According to a second aspect of the present invention there is provided an apparatus configured to: receive data useable to derive: a representation of a signal at a relatively low level of quality; and a set of data elements; obtain a set of reconstruction elements based at least in part on the set of data elements, the set of reconstruction elements useable to reconstruct a representation of the signal at a relatively high level of quality using data based on a representation of the signal at a relatively low level of quality, the representation of the signal at the relatively high level of quality being arranged as an array of signal elements comprising at least first and second rows of signal elements, wherein a reconstruction element in the set of reconstruction elements is associated with a respective signal element in the representation of the signal at the relatively high level of quality; and reconstruct the representation of the signal at the relatively high level of quality based at least in part on the representation of the signal at the relatively low level of quality and the set of reconstruction elements, wherein at least one data element in the set of data elements is associated with: at least two reconstruction elements associated with signal elements from the first row of signal elements in the representation of the signal at the relatively high level of quality; and a different number of reconstruction elements associated with signal elements from the second row of signal elements in the representation of the signal at the relatively high level of quality.

According to a third aspect of the present invention there is provided a method comprising: obtaining a set of reconstruction elements, the set of reconstruction elements being useable to reconstruct a representation of a signal at a relatively high level of quality using data based on a representation of the signal at a relatively low level of quality, the representation of the signal at the relatively high level of quality being arranged as an array of signal elements comprising at least first and second rows of signal elements, wherein a reconstruction element in the set of reconstruction elements is associated with a respective signal element in the representation of the signal at the relatively high level of quality; deriving a set of data elements based on the set of reconstruction elements, at least one data element in the set of data elements being derived from a plurality of reconstruction elements in the set of reconstruction elements; and outputting data useable to derive: the representation of the signal at the relatively low level of quality; and the set of data elements, wherein at least one data element in the set of data elements is derived from: at least two reconstruction elements associated with signal elements from the first row of signal elements in the representation of the signal at the relatively high level of quality; and a different number of reconstruction elements associated with signal elements from the second row of signal elements in the representation of the signal at the relatively high level of quality.

According to a fourth aspect of the invention there is provided a computer program comprising instructions which, when executed, cause an apparatus to perform a method comprising: obtaining a set of reconstruction elements, the set of reconstruction elements being useable to reconstruct a representation of a signal at a relatively high level of quality using data based on a representation of the signal at a relatively low level of quality, the representation of the signal at the relatively high level of quality being arranged as an array of signal elements comprising at least first and second rows of signal elements, wherein a reconstruction element in the set of reconstruction elements is associated with a respective signal element in the representation of the signal at the relatively high level of quality; deriving a set of data elements based on the set of reconstruction elements, at least one data element in the set of data elements being derived from a plurality of reconstruction elements in the set of reconstruction elements; and outputting data useable to derive: the representation of the signal at the relatively low level of quality; and the set of data elements, wherein at least one data element in the set of data elements is derived from: at least two reconstruction elements associated with signal elements from the first row of signal elements in the representation of the signal at the relatively high level of quality; and a different number of reconstruction elements associated with signal elements from the second row of signal elements in the representation of the signal at the relatively high level of quality.

According to a fifth aspect of the present invention there is provided a computer-readable medium comprising a computer program comprising instructions which, when executed, cause an apparatus to perform a method comprising: obtaining a set of reconstruction elements, the set of reconstruction elements being useable to reconstruct a representation of a signal at a relatively high level of quality using data based on a representation of the signal at a relatively low level of quality, the representation of the signal at the relatively high level of quality being arranged as an array of signal elements comprising at least first and second rows of signal elements, wherein a reconstruction element in the set of reconstruction elements is associated with a respective signal element in the representation of the signal at the relatively high level of quality; deriving a set of data elements based on the set of reconstruction elements, at least one data element in the set of data elements being derived from a plurality of reconstruction elements in the set of reconstruction elements; and outputting data useable to derive: the representation of the signal at the relatively low level of quality; and the set of data elements, wherein at least one data element in the set of data elements is derived from: at least two reconstruction elements associated with signal elements from the first row of signal elements in the representation of the signal at the relatively high level of quality; and a different number of reconstruction elements associated with signal elements from the second row of signal elements in the representation of the signal at the relatively high level of quality.

According to a sixth aspect of the present invention, there is provided a method comprising: receiving data useable to derive: a representation of a signal at a relatively low level of quality; and a set of data elements; obtaining a set of reconstruction elements based at least in part on the set of data elements, the set of reconstruction elements useable to reconstruct a representation of the signal at a relatively high level of quality using data based on a representation of the signal at a relatively low level of quality, the representation of the signal at the relatively high level of quality being arranged as an array of signal elements comprising at least first and second rows of signal elements, wherein a reconstruction element in the set of reconstruction elements is associated with a respective signal element in the representation of the signal at the relatively high level of quality; and reconstructing the representation of the signal at the relatively high level of quality based at least in part on the representation of the signal at the relatively low level of quality and the set of reconstruction elements, wherein at least one data element in the set of data elements is associated with: at least two reconstruction elements associated with signal elements from the first row of signal elements in the representation of the signal at the relatively high level of quality; and a different number of reconstruction elements associated with signal elements from the second row of signal elements in the representation of the signal at the relatively high level of quality.

According to a seventh aspect of the present invention, there is provided a computer program comprising instructions which, when executed, cause an apparatus to perform a method comprising: receiving data useable to derive: a representation of a signal at a relatively low level of quality; and a set of data elements; obtaining a set of reconstruction elements based at least in part on the set of data elements, the set of reconstruction elements useable to reconstruct a representation of the signal at a relatively high level of quality using data based on a representation of the signal at a relatively low level of quality, the representation of the signal at the relatively high level of quality being arranged as an array of signal elements comprising at least first and second rows of signal elements, wherein a reconstruction element in the set of reconstruction elements is associated with a respective signal element in the representation of the signal at the relatively high level of quality; and reconstructing the representation of the signal at the relatively high level of quality based at least in part on the representation of the signal at the relatively low level of quality and the set of reconstruction elements, wherein at least one data element in the set of data elements is associated with: at least two reconstruction elements associated with signal elements from the first row of signal elements in the representation of the signal at the relatively high level of quality; and a different number of reconstruction elements associated with signal elements from the second row of signal elements in the representation of the signal at the relatively high level of quality.

According to an eighth aspect of the present invention, there is provided a computer-readable medium comprising a computer program comprising instructions which, when executed, cause an apparatus to perform a method comprising: receiving data useable to derive: a representation of a signal at a relatively low level of quality; and a set of data elements; obtaining a set of reconstruction elements based at least in part on the set of data elements, the set of reconstruction elements useable to reconstruct a representation of the signal at a relatively high level of quality using data based on a representation of the signal at a relatively low level of quality, the representation of the signal at the relatively high level of quality being arranged as an array of signal elements comprising at least first and second rows of signal elements, wherein a reconstruction element in the set of reconstruction elements is associated with a respective signal element in the representation of the signal at the relatively high level of quality; and reconstructing the representation of the signal at the relatively high level of quality based at least in part on the representation of the signal at the relatively low level of quality and the set of reconstruction elements, wherein at least one data element in the set of data elements is associated with: at least two reconstruction elements associated with signal elements from the first row of signal elements in the representation of the signal at the relatively high level of quality; and a different number of reconstruction elements associated with signal elements from the second row of signal elements in the representation of the signal at the relatively high level of quality.

According to a ninth aspect of the present invention there is provided an apparatus configured to: obtain a set of reconstruction elements, the set of reconstruction elements being useable to reconstruct a representation of a signal at a relatively high level of quality using data based on a representation of the signal at a relatively low level of quality, the representation of the signal at the relatively high level of quality being arranged as an array of signal elements comprising at least first and second rows of signal elements, wherein a reconstruction element in the set of reconstruction elements is associated with a respective signal element in the representation of the signal at the relatively high level of quality; derive a set of data elements based on the set of reconstruction elements, at least one data element in the set of data elements being derived from a plurality of reconstruction elements in the set of reconstruction elements; and output data useable to derive: the representation of the signal at the relatively low level of quality; and the set of data elements, wherein deriving the set of data elements comprises: selecting a transformation matrix from a plurality of candidate transformation matrices having the same dimensions as each other; and performing an operation using the set of reconstruction elements and the selected transformation matrix to derive the set of data elements.

According to a tenth aspect of the present invention, there is provided an apparatus configured to: receive data useable to derive: a representation of a signal at a relatively low level of quality; and a set of data elements; obtain a set of reconstruction elements based at least in part on the set of data elements, the set of reconstruction elements useable to reconstruct a representation of the signal at a relatively high level of quality using data based on a representation of the signal at a relatively low level of quality, the representation of the signal at the relatively high level of quality being arranged as an array of signal elements comprising at least first and second rows of signal elements, wherein a reconstruction element in the set of reconstruction elements is associated with a respective signal element in the representation of the signal at the relatively high level of quality; and reconstruct the representation of the signal at the relatively high level of quality based at least in part on the representation of the signal at the relatively low level of quality and the set of reconstruction elements, wherein deriving the set of data elements comprises: selecting an inverse transformation matrix from a plurality of candidate inverse transformation matrices having the same dimensions as each other; and performing an operation using the set of data elements and the selected inverse transformation matrix to derive the set of reconstruction elements.

According to an eleventh aspect of the present invention, there is provided a method comprising: obtaining a set of reconstruction elements, the set of reconstruction elements being useable to reconstruct a representation of a signal at a relatively high level of quality using data based on a representation of the signal at a relatively low level of quality, the representation of the signal at the relatively high level of quality being arranged as an array of signal elements comprising at least first and second rows of signal elements, wherein a reconstruction element in the set of reconstruction elements is associated with a respective signal element in the representation of the signal at the relatively high level of quality; deriving a set of data elements based on the set of reconstruction elements, at least one data element in the set of data elements being derived from a plurality of reconstruction elements in the set of reconstruction elements; and outputting data useable to derive: the representation of the signal at the relatively low level of quality; and the set of data elements, wherein deriving the set of data elements comprises: selecting a transformation matrix from a plurality of candidate transformation matrices having the same dimensions as each other; and performing an operation using the set of reconstruction elements and the selected transformation matrix to derive the set of data elements.

According to a twelfth aspect of the present invention, there is provided a method comprising: receiving data useable to derive: a representation of a signal at a relatively low level of quality; and a set of data elements; obtaining a set of reconstruction elements based at least in part on the set of data elements, the set of reconstruction elements useable to reconstruct a representation of the signal at a relatively high level of quality using data based on a representation of the signal at a relatively low level of quality, the representation of the signal at the relatively high level of quality being arranged as an array of signal elements comprising at least first and second rows of signal elements, wherein a reconstruction element in the set of reconstruction elements is associated with a respective signal element in the representation of the signal at the relatively high level of quality; and reconstructing the representation of the signal at the relatively high level of quality based at least in part on the representation of the signal at the relatively low level of quality and the set of reconstruction elements, wherein deriving the set of data elements comprises: selecting an inverse transformation matrix from a plurality of candidate inverse transformation matrices having the same dimensions as each other; and performing an operation using the set of data elements and the selected inverse transformation matrix to derive the set of reconstruction elements. Further features and advantages will become apparent from the following description of preferred embodiments, given by way of example only, which is made with reference to the accompanying drawings.

DETAILED DESCRIPTION OF CERTAIN INVENTIVE EMBODIMENTS

Figure 1:
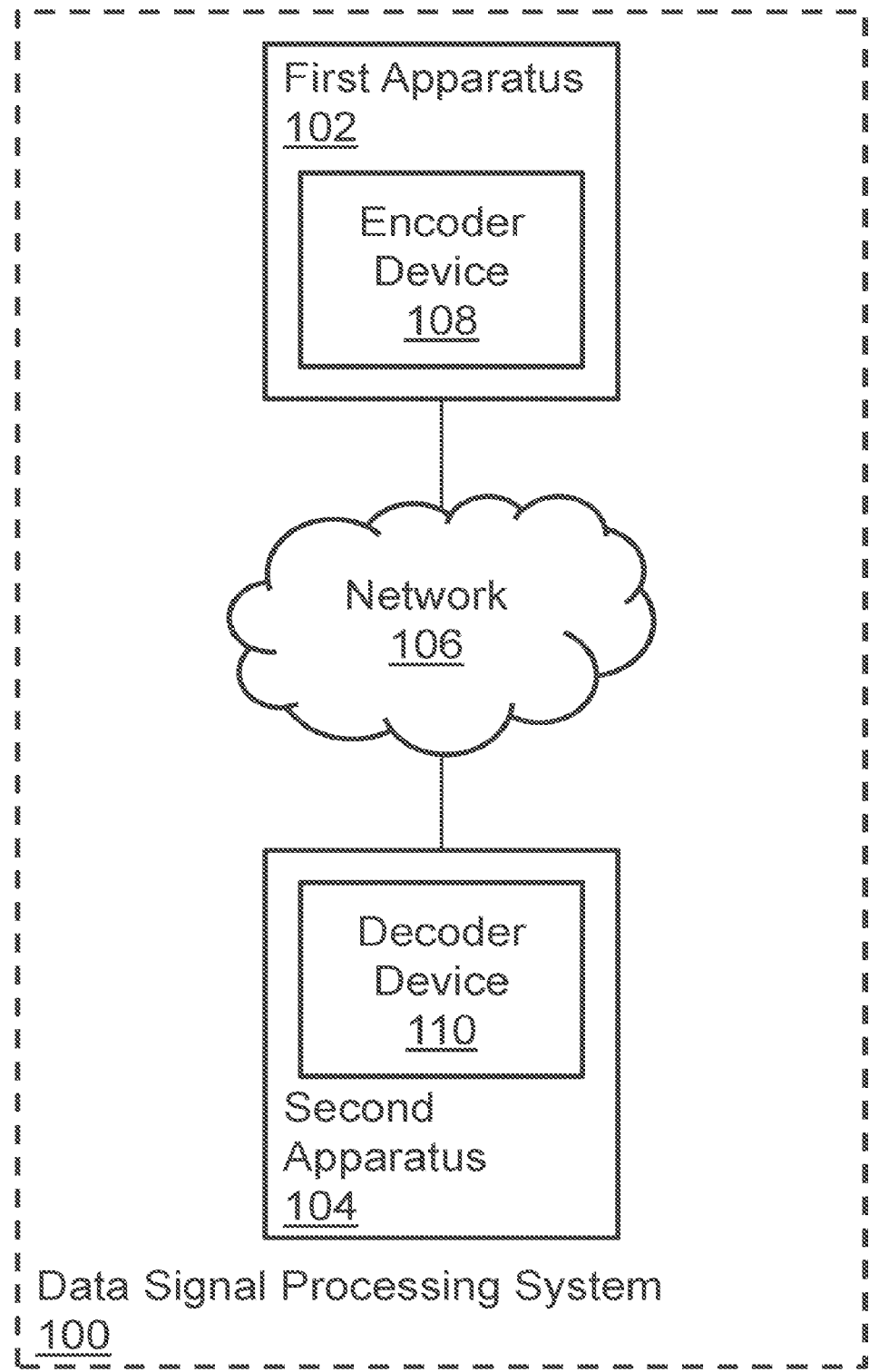
FIG. 1 shows a schematic block diagram of an example of a signal processing system in accordance with an embodiment of the present invention.

Referring to FIG. 1, there is shown an example of a signal processing system 100. The signal processing system 100 is used to process signals. Examples of types of signal include, but are not limited to, video signals, image signals, audio signals, volumetric signals such as those used in medical, scientific or holographic imaging, or other multidimensional signals.

The signal processing system 100 includes a first apparatus 102 and a second apparatus 104. The first apparatus 102 and second apparatus 104 may have a client-server relationship, with the first apparatus 102 performing the functions of a server device and the second apparatus 104 performing the functions of a client device. The signal processing system 100 may include at least one additional apparatus. The first apparatus 102 and/or second apparatus 104 may comprise one or more components. The components may be implemented in hardware and/or software. The one or more components may be co-located or may be located remotely from each other in the signal processing system 100. Examples of types of apparatus include, but are not limited to, computerised devices, routers, workstations, handheld or laptop computers, tablets, mobile devices, games consoles, smart televisions, set-top boxes, etc.

The first apparatus 102 is communicatively coupled to the second apparatus 104 via a data communications network 106. Examples of the data communications network 106 include, but are not limited to, the Internet, a Local Area Network (LAN) and a Wide Area Network (WAN). The first and/or second apparatus 102, 104 may have a wired and/or wireless connection to the data communications network 106.

The first apparatus 102 comprises an encoder device 108. The encoder device 108 is configured to encode signal data. The encoder device 108 may perform one or more further functions in addition to encoding signal data. The encoder device 108 may be embodied in various different ways. For example, the encoder device 108 may be embodied in hardware and/or software.

The second apparatus 104 comprises a decoder device 110. The decoder device 110 is configured to decode signal data. The decoder device 110 may perform one or more further functions in addition to decoding signal data. The decoder device 110 may be embodied in various different ways. For example, the decoder device 110 may be embodied in hardware and/or software.

The encoder device 108 encodes signal data and transmits the encoded signal data to the decoder device 110 via the data communications network 106. The decoder device 110 decodes the received, encoded signal data and generates decoded signal data. The decoder device 110 may output the decoded signal data, or data derived using the decoded signal data. For example, the decoder device 110 may output such data for display on one or more display devices associated with the second apparatus 104.

In some examples described herein, the encoder device 108 transmits to the decoder device 110 a representation of a signal at a given level of quality and information the decoder device 110 can use to reconstruct a representation of the signal at one or more higher levels of quality.

Compared to some known techniques, the examples described herein involve transmitting a relatively small amount of information to be used for such reconstruction. This reduces the amount of data transmitted via the data communications network 106. The savings may be particularly relevant where the signal data corresponds to high quality video data, where the amount of information transmitted in known systems can be especially high.

Figure 2:
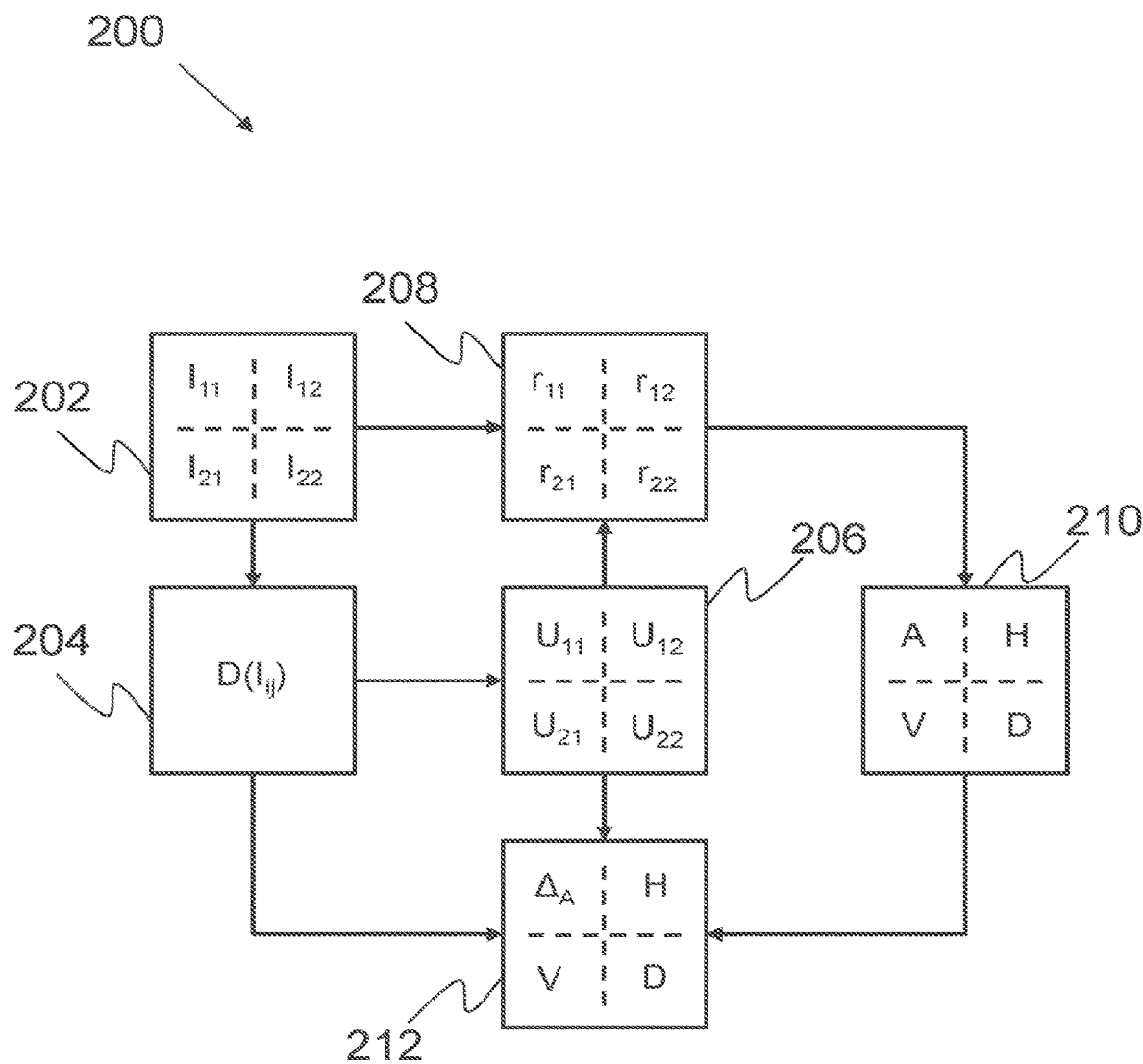
FIG. 2 shows schematically an example of a signal processing technique in accordance with an embodiment of the present invention.

Referring to FIG. 2, there is shown schematically an example of a signal processing technique 200. The signal processing technique 200 is performed by the encoder device 108.

Input data 202 comprises a representation of a signal at a relatively high level of quality. The input data 202 is arranged as an array of signal elements comprising first and second rows of signal elements. The first row includes signal elements $I_{11}$ and $I_{12}$ and the second row includes signal elements $I_{21}$ and $I_{22}$. In this example, the input data 202 is arranged as a 2×2 array including signal elements $I_{11}$, $I_{12}$, $I_{21}$, $I_{22}$. The input data 202 may have a different number of rows, columns and/or signal elements in other examples. In reality a larger number of signal elements may be used, for example corresponding to high image resolutions. Examples of image display resolutions include, but are not limited to, 1920×1080, 1920×540, and 960×540.

The input data 202 is processed to generate data 204 based on the input data 202. In this example, the data 204 is processed by downsampling the input data 202. In this specific example, the data 204 is referred to as "downsampled data", it being understood that that the data could be processed in a different way in other examples. In this example, downsampling involves calculating an average of the values of the signal elements $I_{11}$, $I_{12}$, $I_{21}$, $I_{22}$ in the input data 202. In other examples, downsampling could involve other functions or calculations. In this example, the downsampled data 204 is arranged as a 1×1 array including a single element, $D(I_{ij})$. As such, in this example, $$D(I_{ij}) = \frac{1}{4}\sum\nolimits_{i,j} I_{ij}.$$

In some examples, the downsampling involves calculating an average of the values of the signal elements $I_{11}$, $I_{12}$, $I_{21}$, $I_{22}$ in the input data 202 and performing one or more further operations as part of the overall downsampling process. For example, downsampling may involve quantising the calculated average value. In such examples, the downsampled data 204, $D(I_{ij})$, may be different from the average of the values of the signal elements $I_{11}$, $I_{12}$, $I_{21}$, $I_{22}$ in the input data 202.

The downsampled data 204 is a representation of the signal at a relatively low level of quality. In this example, the level of quality corresponds to the reduced resolution of the representation of the signal, namely 1×1, compared to the resolution of the representation of the signal in the input data 202, namely 2×2.

The downsampled data 204 is processed to generate data 206. In this example, the data 206 is processed by upsampling the downsampled data 204. In this specific example, the data 206 is referred to as "upsampled data", it being understood that that the data could be processed in a different way in other examples. In some examples, upsampling involves performing a Nearest Neighbour operation on the value of the element, $D(I_{ij})$, of the downsampled data 204. Upsampling may additionally use neighbouring elements relative to $D(I_{ij})$ to perform bilinear, bicubic and/or any other upsampling operation. The upsampled data 206 is arranged as an array of signal elements comprising first and second rows of signal elements. The first row includes signal elements $U_{11}$ and $U_{12}$ and the second row includes signal elements $U_{21}$ and $U_{22}$. In this example, the upsampled data 206 is arranged as a 2×2 array including signal elements, $U_{11}$, $U_{12}$, $U_{21}$, $U_{22}$. The upsampled data 206 is based on a representation of the signal at a relatively low level of quality, namely the downsampled data 204.

The input data 202 and the upsampled data 206 are used to obtain reconstruction data 208. In this example, the reconstruction data 208 is in the form of a set of reconstruction elements. The reconstruction data 208 is arranged as an array of reconstruction elements comprising first and second rows of signal elements. The first row includes reconstruction elements $r_{11}$ and $r_{12}$ and the second row includes reconstruction elements $r_{21}$ and $r_{22}$. In this example, the reconstruction data 208 is arranged as a 2×2 array including reconstruction elements $r_{11}$, $r_{12}$, $r_{21}$, $r_{22}$. The reconstruction data 208 may be arranged in a form other than a 2×2 array, for example a 4×1 or 1×4 array.

In this example, a given reconstruction element is obtained by subtracting a value of a signal element in the upsampled data 206 from a value of a corresponding signal element in the input data 202. As such, $r_{ij}=I_{ij}-U_{ij}$, where i indicates a row number associated with the element and j indicates a column number associated with the element. Since $I_{ij}=U_{ij}+r_{ij}$, the set of reconstruction elements 208 is useable in combination with the upsampled data 206 to reconstruct the input data 202.

A reconstruction element in the set of reconstruction elements 208 is associated with a respective signal element in the input data 202. For example, reconstruction element $r_{12}$ in the reconstruction data 208 is associated with respective signal element $I_{12}$ in the input data 202.

A first set of data elements 210 is derived based on the set of reconstruction elements 208. In this example, the first set of data elements 210 is arranged as an array of data elements comprising first and second rows of signal elements. In this example, the first set of data elements 210 is arranged as a 2×2 array of data elements, A, H, V, D. The elements in the first set of data elements 210 are referred to herein as "transformed elements". The elements in the first set of data elements 210 may be arranged in a form other than a 2×2 array, for example a 4×1 or 1×4 array.

The first set of data elements 210 is derived by pre-multiplying the set of reconstruction elements 208 with a transformation matrix (or 'kernel'), K. In this example, the transformation matrix is a 4×4 matrix:

$$K = \frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

In this example, the first set of data elements 210 is derived based on the following equation:

$$\begin{bmatrix} A \\ H \\ V \\ D \end{bmatrix} = \frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix} \cdot \begin{bmatrix} r_{11} \\ r_{12} \\ r_{21} \\ r_{22} \end{bmatrix} \quad \text{(eq. 1)}$$

As such, $$A = \frac{1}{4}(r_{11}+r_{12}+r_{21}+r_{22}),$$

$$H = \frac{1}{4}(r_{11}-r_{12}+r_{21}-r_{22}),$$

$$V = \frac{1}{4}(r_{11}+r_{12}-r_{21}-r_{22})$$

and $$D = \frac{1}{4}(r_{11}-r_{12}-r_{21}+r_{22}).$$

A represents an average of the values in the set of reconstruction elements 208. H represents a horizontal correlation and/or 'tilt' between the values in the set of reconstruction elements 208. V represents a vertical correlation and/or 'tilt' between the values in the set of reconstruction elements 208. D represents a diagonal correlation and/or 'tilt' between the values in the set of reconstruction elements 208. The transformed elements described herein thus exploit directional correlation between different reconstruction elements.

At least one data element in the first set of data elements 210 is therefore derived from a plurality of reconstruction elements in the set of reconstruction elements 208. In this specific example, all data elements in the first set of data elements 210 are derived from a plurality of reconstruction elements in the set of reconstruction elements 208. More specifically, all data elements in the first set of data elements 210 are derived from all of the reconstruction elements in the set of reconstruction elements 208.

As indicated above, A is the average of all of the reconstruction elements $r_{ij}$. This can be written mathematically as:

$$A = \frac{1}{4}\sum_{i,j} r_{ij}.$$

However, since $$r_{ij} = I_{ij} - U_{ij},$$

$$A = \frac{1}{4}\sum_{i,j} r_{i,j} = \frac{1}{4}\sum_{i,j}(I_{ij}-U_{ij}) = \frac{1}{4}\sum_{i,j} I_{ij} - \frac{1}{4}\sum_{i,j} U_{ij}.$$

The value $D(I_{ij})$ may be added to and subtracted from the right hand side of this equation without affecting the equality with the left hand side of the equation:

$$A = \frac{1}{4}\sum_{i,j}I_{ij} - \frac{1}{4}\sum_{i,j}U_{ij} = \frac{1}{4}\sum_{i,j}I_{ij} + \{-D(I_{ij}) + D(I_{ij})\} - \frac{1}{4}\sum_{i,j}U_{ij} =$$

$$\left\{\frac{1}{4}\sum_{i,j}I_{ij} - D(I_{ij})\right\} + \left\{D(I_{ij}) - \frac{1}{4}\sum_{i,j}U_{ij}\right\}.$$

A new element, referred to herein as the delta average is defined as:

$$\Delta_A := \left\{\frac{1}{4}\sum_{i,j}I_{ij} - D(I_{ij})\right\}.$$

It can therefore be seen that:

$$A = \Delta_A + \left\{D(I_{ij}) - \frac{1}{4}\sum_{i,j}U_{ij}\right\}.$$

The encoder device 108 may derive the delta average, $\Delta_A$, by calculating $$\frac{1}{4}\sum_{i,j}I_{ij} - D(I_{ij}).$$

In some examples, the encoder device 108 derives the delta average, $\Delta_A$, by calculating $$A - \left\{D(I_{ij}) - \frac{1}{4}\sum_{i,j}U_{ij}\right\}.$$

The term $$\left\{D(I_{ij}) - \frac{1}{4}\sum_{i,j}U_{ij}\right\}$$

may be referred to as the predicted average, $A_P$, and corresponds to the difference between the average, A, of the reconstruction elements $r_{ij}$, and the delta average, $\Delta_A$. As will be described in more detail below, the values relating to the predicted average, $D(I_{ij})$ and $\frac{1}{4}\Sigma_{i,j}U_{ij}$, are known and/or may be determined at the decoder device 110. The decoder device 110 may therefore be able to calculate A if it is provided with the delta average, $\Delta_A$.

As explained above, in this example, the downsampling operation involves calculating the average of the values of the signal elements $I_{11}$, $I_{12}$, $I_{21}$, $I_{22}$ in the input data 202, and so $$D(I_{ij}) = \frac{1}{4}\sum_{i,j}I_{ij}.$$

Replacing the term $D(I_{ij})$ in the above definition of the delta average, $\Delta_A$, gives $$\Delta_A = \left\{\frac{1}{4}\sum_{i,j}I_{ij} - \frac{1}{4}\sum_{i,j}I_{ij}\right\} = 0.$$

In other examples, the downsampling operation involves calculating the average of the values of the signal elements $I_{11}$, $I_{12}$, $I_{21}$, $I_{22}$ in the input data 202 and at least one further operation, for example quantisation. In such example, the delta average, $\Delta_A$, may be non-zero. However, the delta average may nevertheless be relatively small compared to the average value A, meaning that less data may be used to send the value $\Delta_A$ than the value A.

Instead of the encoder device 108 transmitting the first set of data elements 210 to the decoder device 110, in some examples the encoder device 108 transmits a second set of data elements 212 instead. The elements in the second set of data elements 212 are referred to herein as "correlation elements". The second set of data elements 212 is similar to the first set of data elements 210, but the average value A is replaced by the delta average, $\Delta_A$. Since the delta average, $\Delta_A$, is likely to be smaller than the average value, A, and may be zero in some cases, less data may be used to transmit the second set of data elements 212 than the first set of data elements 210.

In this example, the encoder device 108 transmits the downsampled data 204, $D(I_{ij})$, and the second set of data elements 212 to the decoder device 110.

As explained above, in this example, all data elements in the first set of data elements 210 are derived from all of the reconstruction elements in the set of reconstruction elements 208. In other words, each data element in the first set of data elements 210 is derived based on contributions from each of the reconstruction elements in the set of reconstruction elements 208.

In examples that will now be described, by changing the values of the elements in the transformation matrix, K, a more flexible and adaptable data processing technique is provided. In particular, the technique may be adapted based on one or more attributes of the input data 202. For example, the data processing technique may be adapted based on the strength of correlations between neighbouring elements in the input data 202.

Figure 3:
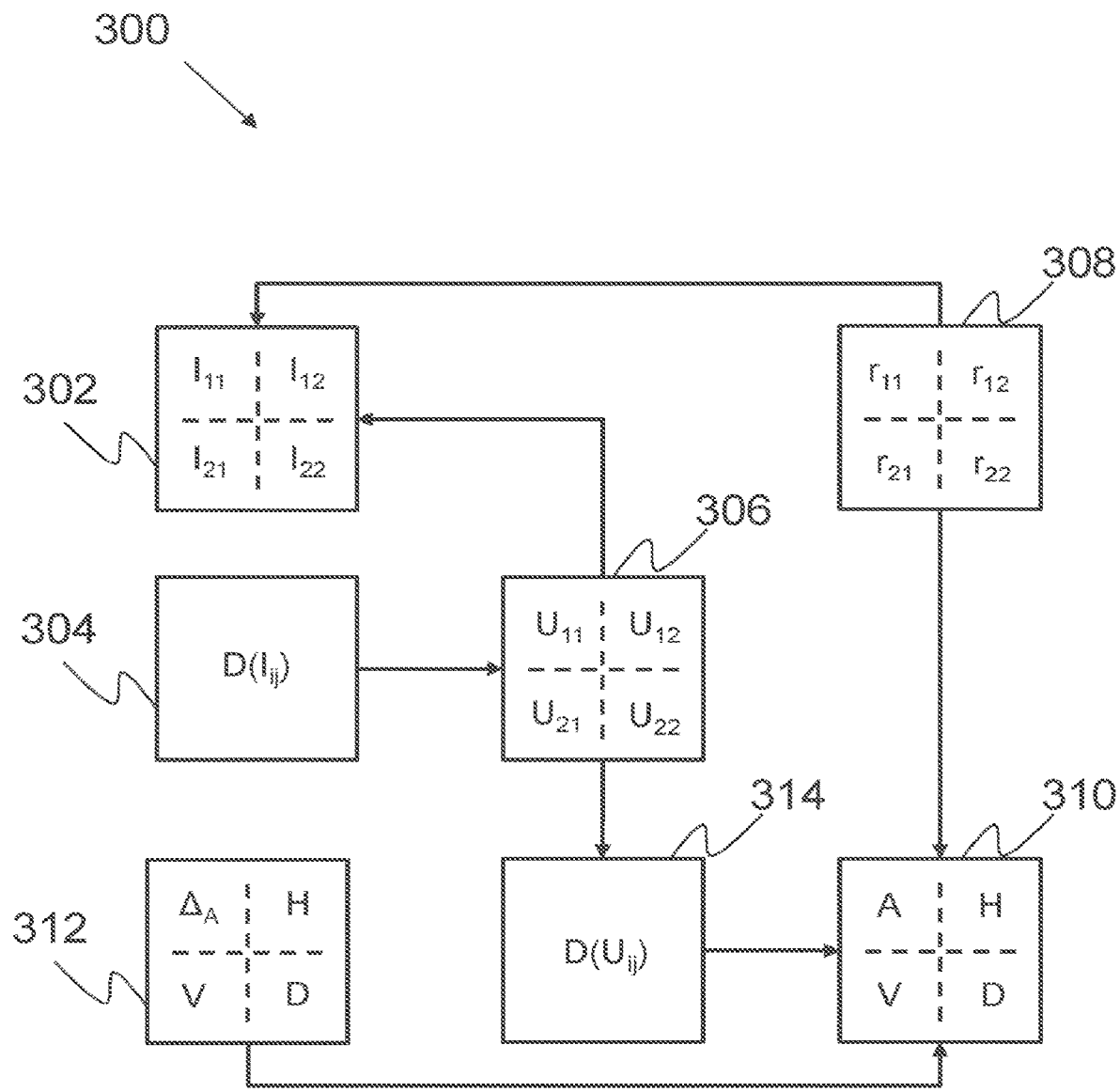
FIG. 3 shows schematically another example of a signal processing technique in accordance with an embodiment of the present invention.

Referring to FIG. 3, there is shown schematically an example of a signal processing technique 300. The signal processing technique 300 is performed by the decoder device 110. Some items depicted in FIG. 3 are similar to items shown in FIG. 2. Corresponding reference signs, incremented by 100, have therefore been used for similar items.

In this example, the decoder device 110 receives downsampled data 304, $D(I_{ij})$, and the second set of data elements 312 from the encoder device 108. In other examples, the decoder device 110 receives data usable to obtain the downsampled data 304. For example, the decoder device 110 may reconstruct the downsampled data 304 based on the received data. In a specific example, an H.264 data stream is reconstructed by an H.264 encoder.

The downsampled data 304 is processed to generate data 306. In this example, the downsampled data 304 is processed by upsampling the downsampled data 304 in the same manner as the encoder device 108 upsampled the data 204. In other examples, the decoder device 110 processes the downsampled data 304 in a different manner from the manner in which the encoder device 108 processes the data 204. In this specific example, the data 306 is referred to as "upsampled data", it being understood that the data could be processed in a different way in other examples.

The upsampled data 306 is processed to generate data 314 based on the upsampled data 306. In this example, the upsampled data 306 is processed by downsampling the upsampled data 306 in the same manner as the encoder device 108 downsampled the input data 202. In this specific example, the data 314 is referred to as "further downsampled data", it being understood that the data 306 could be processed in a different way in other examples. The decoder device 110 therefore calculates an average of the values of the signal elements $U_{11}$, $U_{12}$, $U_{21}$, $U_{22}$ in the upsampled data 306. In some examples, the decoder device 110 does not downsample the upsampled data 306, but calculates the average of the values of the signal elements $U_{11}$, $U_{12}$, $U_{21}$, $U_{22}$ in another manner.

In this example, the further downsampled data 314 is arranged as a 1×1 array including a single element, $D(U_{ij})$, representing the downsampled value. In this example, $$D(U_{ij}) = \frac{1}{4}\sum_{i,j} U_{ij},$$

The second set of data elements 312 received from the encoder device 108 includes the delta average, $\Delta_A$. Since $$A = \Delta_A + \left\{ D(I_{ij}) - \frac{1}{4}\sum_{i,j} U_{ij} \right\}$$

and $$D(U_{ij}) = \frac{1}{4}\sum_{i,j} U_{ij},$$

then $A = \Delta_A + D(I_{ij}) - D(U_{ij})$. Since the decoder device 110 receives the delta average, $\Delta_A$, and the downsampled data 304, $D(I_{ij})$, or data usable to derive the downsampled data 304, $D(I_{ij})$, from the encoder device 108, and has derived the further downsampled data 314, $D(U_{ij})$, itself, the decoder device 110 can calculate the average value, A. As such, the decoder device 110 can derive the first set of data elements 310.

The decoder device 110 derives the set of reconstruction elements 308 by pre-multiplying the first set of data elements 310 with the inverse of the transformation matrix, $K^{-1}$, namely:

$$K^{-1} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

Using eq. 1 above:

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} \cdot \begin{bmatrix} A \\ H \\ V \\ D \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \cdot \frac{1}{4} \begin{bmatrix} 1 & 1 & 1 & 1 \\ 1 & -1 & 1 & -1 \\ 1 & 1 & -1 & -1 \\ 1 & -1 & -1 & 1 \end{bmatrix} \cdot \begin{bmatrix} r_{11} \\ r_{12} \\ r_{21} \\ r_{22} \end{bmatrix}.$$

Since pre-multiplying the transformation matrix K by its inverse $K^{-1}$ gives the identity matrix:

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} \cdot \begin{bmatrix} A \\ H \\ V \\ D \end{bmatrix} = \begin{bmatrix} r_{11} \\ r_{12} \\ r_{21} \\ r_{22} \end{bmatrix}$$

As such, $r_{11}=A+H+V+D$, $r_{12}=A-H+V-D$, $r_{21}=A+H-V-D$ and $r_{22}=A-H-V+D$.

The decoder device 110 can therefore recover the input data 302 using the equation $I_{ij}=U_{ij}+r_{ij}$ since all of the values $U_{ij}$ and $r_{ij}$ are known to the decoder device 110.

The reader is referred to international patent application no. PCT/EP2013/059847, which relates to a directional decomposition of residual data during signal encoding, decoding and reconstruction in a tiered hierarchy, using a transformation matrix similar to that described above. The entire contents of international patent application no. PCT/EP2013/059847 are incorporated herein by reference.

Figure 4:
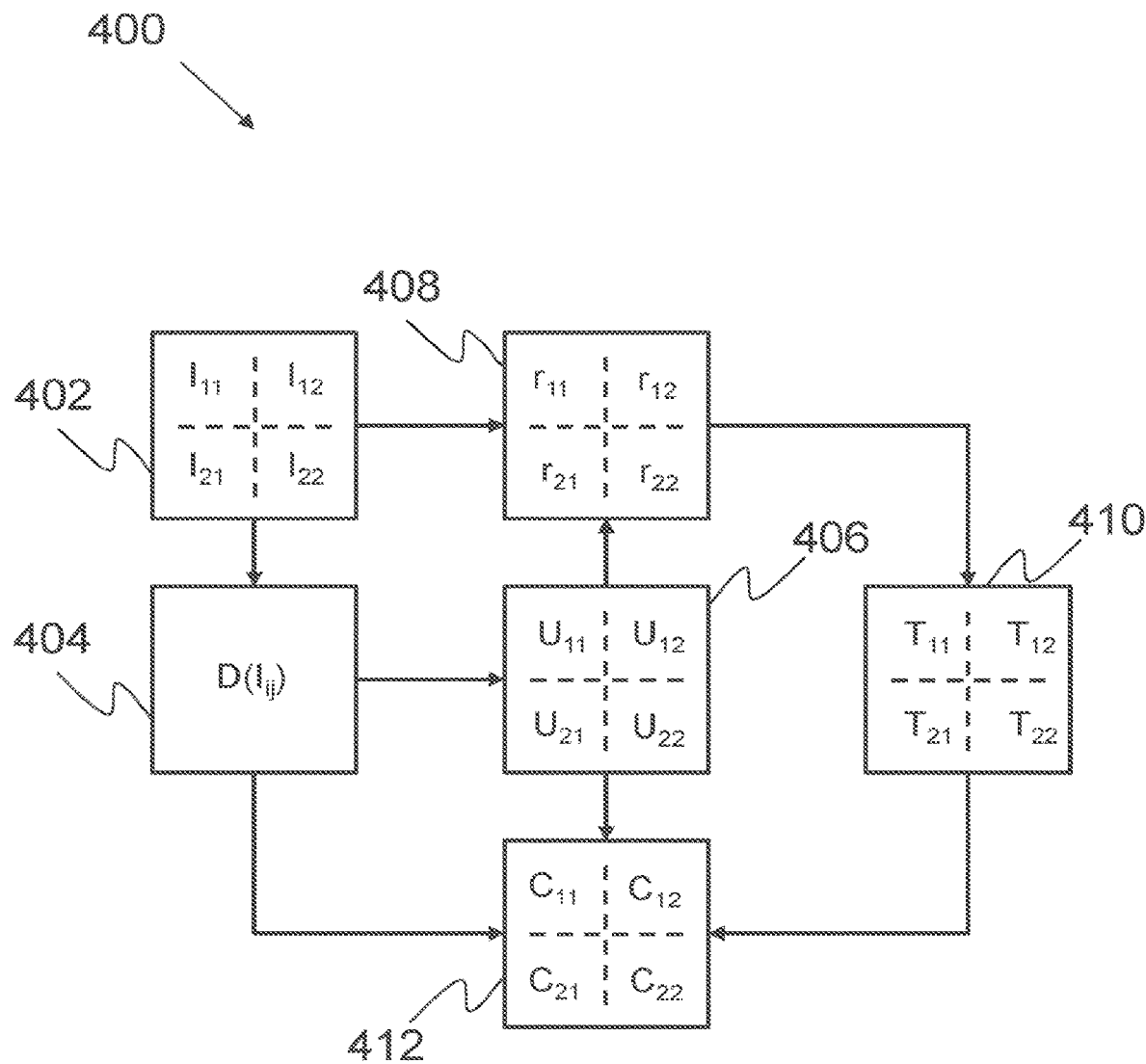
FIG. 4 shows schematically another example of a signal processing technique in accordance with an embodiment of the present invention.

Referring to FIG. 4, there is shown schematically an example of a signal processing technique 400. The signal processing technique 400 is performed by the encoder device 108. The input data 402, downsampled data 404, upsampled data 406 and the set of reconstruction elements 408 are the same as the input data 202, the downsampled data 204, the upsampled data 206 and the set of reconstruction elements 208 described above with reference to FIG. 2.

In this example, the first set of data elements 410 includes four transformed elements $T_{11}$, $T_{12}$, $T_{21}$, $T_{22}$. The first set of data elements 410 is derived by pre-multiplying the set of reconstruction elements 408 with a transformation matrix, K, where:

$$K = \begin{bmatrix} k_{11} & k_{12} & k_{13} & k_{14} \\ k_{21} & k_{22} & k_{23} & k_{24} \\ k_{31} & k_{32} & k_{33} & k_{34} \\ k_{4l} & k_{42} & k_{43} & k_{44} \end{bmatrix}$$

As such:

$$\begin{bmatrix} T_1 \\ T_2 \\ T_3 \\ T_4 \end{bmatrix} = \begin{bmatrix} k_{11} & k_{12} & k_{13} & k_{14} \\ k_{21} & k_{22} & k_{23} & k_{24} \\ k_{31} & k_{32} & k_{33} & k_{34} \\ k_{41} & k_{42} & k_{43} & k_{44} \end{bmatrix} \cdot \begin{bmatrix} r_{11} \\ r_{12} \\ r_{21} \\ r_{22} \end{bmatrix},$$

$T_1=(k_{11} \cdot r_{11}+k_{12} \cdot r_{12}+k_{13} \cdot r_{21}+k_{14} \cdot r_{22})$, $T_2=(k_{21} \cdot r_{11}+k_{22} \cdot r_{12}+k_{23} \cdot r_{21}+k_{24} \cdot r_{22})$, $T_3=(k_{31} \cdot r_{11}+k_{32} \cdot r_{12}+k_{33} \cdot r_{21}+k_{34} \cdot r_{22})$, and $T_4=(k_{41} \cdot r_{11}+k_{42} \cdot r_{12}+k_{43} \cdot r_{21}+k_{44} \cdot r_{22})$.

Reconstruction element $r_{11}$ is associated with signal element $I_{11}$ which is from the first row of signal elements of the input data 402. Reconstruction element $r_{12}$ is associated with signal element $I_{12}$ which is from the first row of signal elements of the input data 402. Reconstruction element $r_{21}$ is associated with signal element 121 which is from the second row of signal elements of the input data 402. Reconstruction element $r_{22}$ is associated with signal element $I_{22}$ which is from the second row of signal elements of the input data 402.

In this example, at least one data element in the first set of data elements 410 is derived from at least two reconstruction elements associated with signal elements from the first row of signal elements of the input data 402 and a different number of reconstruction elements associated with signal elements from the second row of signal elements of the input data 402. Thus, the at least one data element in the first set of data elements 410 may be derived from two reconstruction elements associated with signal elements from the first row of signal elements of the input data 402 and zero or one reconstruction elements associated with signal elements from the second row of signal elements of the input data 402. Where, for example, the set of reconstruction elements 408 is in the form of a 3×3 array, the at least one data element in the first set of data elements 410 could be derived from two reconstruction elements associated with signal elements from the first row of signal elements of the input data 402 and zero, one or three reconstruction elements associated with signal elements from the second row of signal elements of the input data 402, or could be derived from three reconstruction elements associated with signal elements from the first row of signal elements of the input data 402 and zero, one or two reconstruction elements associated with signal elements from the second row of signal elements of the input data 402.

In some examples, all data elements in the first set of data elements 410 are derived from at least two reconstruction elements associated with signal elements from the first row of signal elements of the input data 402 and a different number of reconstruction elements associated with signal elements from the second row of signal elements of the input data 402.

As such, in this example, at least one data element in the first set of data elements 410 is not derived from contributions of equal numbers of reconstruction elements associated with signal elements from the first and second rows of signal elements of the input data 402. This is in contrast to the elements A, H, V and D described above where each element is derived from contributions of equal numbers of reconstruction elements associated with signal elements from the first and second rows of signal elements of the input data 202, namely two reconstruction elements associated with signal elements from the first row of signal elements of the input data 202 and two reconstruction elements associated with signal elements from the second row of signal elements of the input data 202.

By taking uneven contributions in this way, the contributions of reconstruction elements associated with signal elements from different rows of signal elements of the input data 402 in deriving the first set of data elements 410 can be more readily weighted. In effect, the rows of signal elements of the input data 402 may be decoupled in terms of their relative contributions to the first set of data elements 410. The elements $k_{ij}$ in the transformation matrix, K, may be selected to influence the relative contributions of reconstruction elements associated with signal elements from different rows of signal elements of the input data 402 in deriving the first set of data elements 410. For example, by setting the value of element $k_{23}$ to zero, the contribution of reconstruction element $r_{23}$ is zero in relation to transformed element $T_2$. The transformation matrix, K, in this example, is of the same dimension, namely 4×4, as the transformation matrix, K, described above with reference to FIGS. 2 and 3. The values of the elements $k_{ij}$ of the transformation matrix, K, may be changed to influence the relative contributions of different reconstruction elements. Setting a particular element to have a value of zero does not equate to changing the dimension of the transformation matrix itself. Therefore the same framework as that described above with reference to FIGS. 2 and 3 may still be used where the bespoke transformation matrix, K, described in this example, is used. The values of the elements of the transformation matrix, K, are changed, not the format of the data itself.

The encoder device 110 may derive the second set of data elements 412 based on the first set of data elements 410. In this example, the second set of data elements 412 includes four correlation elements $C_{11}$, $C_{12}$, $C_{21}$ and $C_{22}$. Deriving the second set of data elements 412 may involve determining one or more delta averages as described above.

The encoder device 108 transmits the downsampled data 404, $D(I_{ij})$, and the second set of data elements 412 to the decoder device 110. The decoder device 110 can recover the input data 402 in a similar manner to that described above.

Decoupling the rows of data elements of input data 402 in terms of their respective contributions to the first set of data elements 410 provides various differences and effects compared to the examples described above which take even contributions from adjacent rows of input data elements. Allowing different rows of input data elements to have different weighted contributions may, for example, provide an improved performance when handling interlaced video signals. In interlaced video, a given video frame, for example comprising 1920×1080 data elements, is an arrangement of two fields of video data, each comprising 1920×540 data elements, whose rows of data elements are interlaced with each other. Each of the two fields is representative of the video at different time samples. Accordingly, vertical correlation between adjacent data elements in a frame of interlaced video signal, that is, correlation between data elements of adjacent rows, is reduced, and may even be absent or artificial. Horizontal correlation between adjacent data elements, that is, correlation between data elements of adjacent columns, is more significant than vertical correlation. Therefore, the ability to influence the contributions of data elements from different rows so that, for example, only data elements from a single field are used, may be beneficial in ensuring that any false or unwanted vertical correlation is not taken into account. Additionally, downsampling and upsampling interlaced video signals in two-dimensions may introduce further considerations, owing to the two interlaced fields corresponding to two different points in time. The fields may be de-interlaced prior to downsampling, but this may be computationally expensive and may produce unwanted image artefacts or discontinuities. Therefore, the interlaced video may be downsampled and upsampled in the horizontal dimension only. An example resolution of a field of interlaced video is 1920×540. A horizontally downsampled rendition of the field of interlaced video may have a resolution of 960×540, for example. In such a horizontal downsampling operation, or a corresponding horizontal upsampling operation, no contributions from vertically adjacent data elements are taken into account.

Furthermore, taking unequal contributions from different rows of data elements may also be beneficial in the case of progressive video. In progressive video, cameras may scan images horizontally and may therefore have an effectively one-dimensional transfer function. Therefore, any vertical correlation may be false and it may be desirable to reduce the influence of such artificial vertical correlation. Reducing the influence of false vertical correlation may provide improved distortion curves of quality versus bitrate compared to the examples described above which take equal contributions from adjacent rows of data elements.

Figure 5:
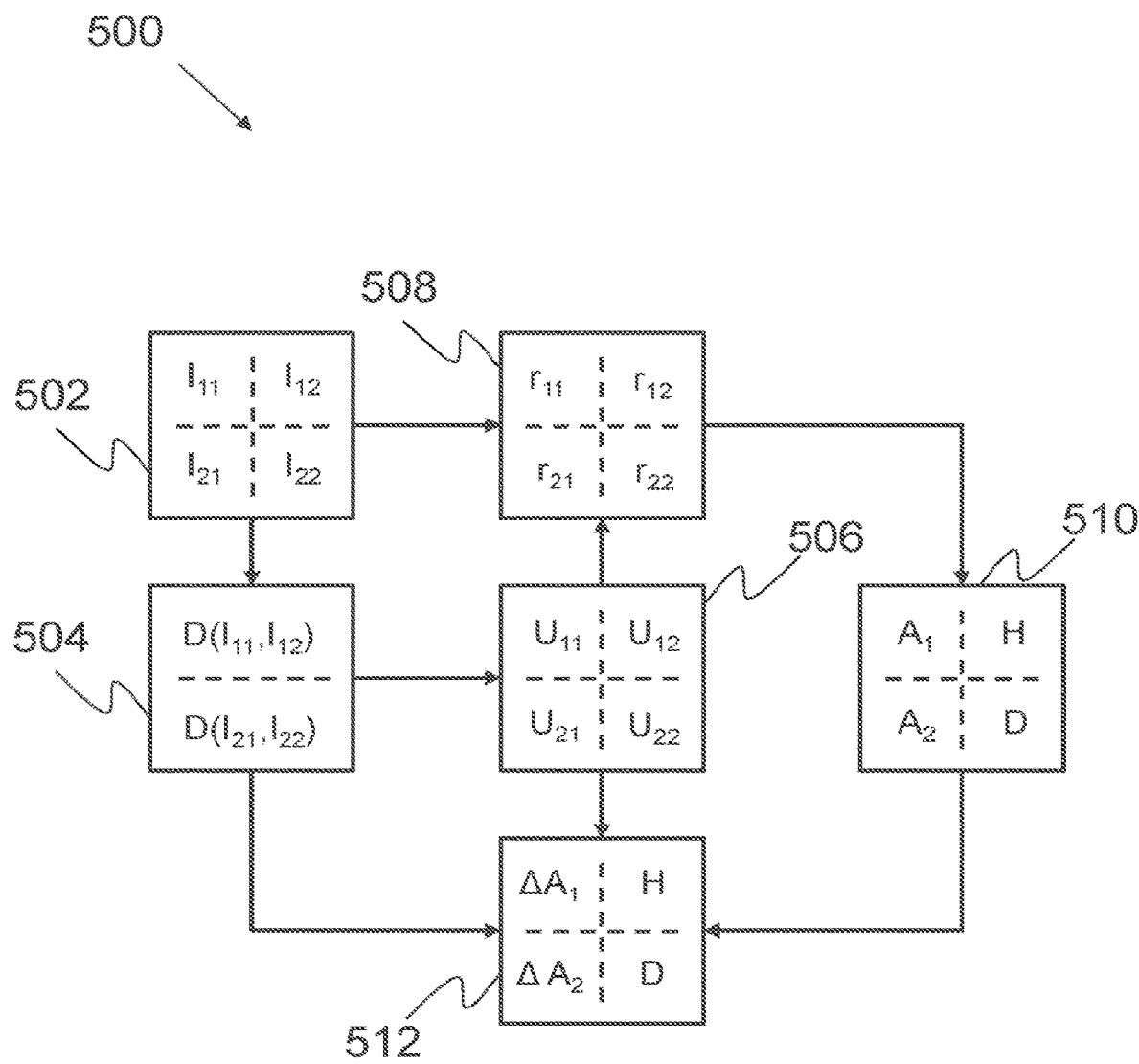
FIG. 5 shows schematically another example of a signal processing technique in accordance with an embodiment of the present invention.

Referring to FIG. 5, there is shown schematically an example of a signal processing technique 500. The signal processing technique 500 is performed by the encoder device 108.

Input data 502 is processed to generate data 504 based on the input data 502. In this example, the data 504 is generated by downsampling the input data 502. In this example, the downsampling operation is performed in one direction only. In this specific example, the downsampling operation is performed in the horizontal direction only. This involves calculating two average values using the signal elements $I_{11}$, $I_{12}$, $I_{21}$, $I_{22}$ in the input data 502. In this example, the downsampled data 504 is arranged as a 2×1 array including two elements, $D(I_{11},I_{12})$ and $D(I_{21},I_{22})$, representing multiple downsampled values. In this example, $$D(I_{11}, I_{12}) = \frac{1}{2}\left(\sum_{j=1}^{2} I_{1j}\right)$$

and $$D(I_{21}, I_{22}) = \frac{1}{2}\left(\sum_{j=1}^{2} I_{2j}\right).$$

If the downsampled data 504 were to be downsampled again in order to obtain a single average value, for example by calculating an average value from the two elements $D(I_{11}, I_{12})$ and $D(I_{21}, I_{22})$, an additional access to memory may be required.

The downsampled data 504 is processed to generate data 506. In this example, the data 506 is obtained by upsampling the data 504. In this example, the upsampling operation is performed in one direction only. In this specific example, the upsampling operation is performed in the horizontal direction only.

A set of reconstruction elements 508 is derived using the input data 502 and the upsampled data 506.

A first set of data elements 510 is derived based on the set of reconstruction elements 508. In this example, the first set of data elements 510 is arranged as an array of data elements comprising first and second rows of data elements. In this example, the first set of data elements 510 is arranged as a 2×2 array of data elements, $A_1$, $H$, $A_2$, $D$.

Data element $A_1$ represents the average value of the reconstruction elements in the first row of the set of reconstruction elements 508, so $$A_1 = \frac{1}{2}\left(\sum_{j=1}^{2} r_{1j}\right).$$

Data element $A_1$ is not derived using contributions from either reconstruction element $r_{21}$ or $r_{22}$ in the second row of the set of reconstruction elements 508. Data element $A_2$ represents the average value of the reconstruction elements in the second row from the set of reconstruction elements 508, so $$A_2 = \frac{1}{2}\left(\sum_{j=1}^{2} r_{2j}\right).$$

Data element $A_2$ is not derived using contributions from either reconstruction element $r_{11}$ or $r_{12}$ in the first row of the set of reconstruction elements 508.

The first set of data elements 510 may be derived by pre-multiplying the set of reconstruction elements 508 with a transformation matrix, $K$, namely:

$$\frac{1}{4}\begin{bmatrix} 2 & 2 & 0 & 0 \\ 1 & -1 & 1 & -1 \\ 0 & 0 & 2 & 2 \\ 1 & -1 & -1 & 1 \end{bmatrix}.$$

As such, $$\begin{bmatrix} A_1 \\ H \\ A_2 \\ D \end{bmatrix} = \frac{1}{4}\begin{bmatrix} 2 & 2 & 0 & 0 \\ 1 & -1 & 1 & -1 \\ 0 & 0 & 2 & 2 \\ 1 & -1 & -1 & 1 \end{bmatrix} \cdot \begin{bmatrix} r_{11} \\ r_{12} \\ r_{21} \\ r_{22} \end{bmatrix} \quad \text{(eq. 2)}$$

and $$A_1 = \frac{1}{4}(2 \cdot r_{11} + 2 \cdot r_{12}), H = \frac{1}{4}(r_{11} - r_{12} + r_{21} - r_{22}), A_2 = \frac{1}{4}(2 \cdot r_{21} + 2 \cdot r_{22})$$

and $$D = \frac{1}{4}(r_{11} - r_{12} - r_{21} + r_{22}).$$

Both $A_1$ and $A_2$ are derived from at least two reconstruction elements associated with signal elements from one row of signal elements of the input data 502 and a different number of reconstruction elements associated with signal elements from another row of signal elements of the input data 502. In particular, $A_1$ is derived from two reconstruction elements associated with signal elements from the first row of signal elements of the input data 502, namely $r_{11}$ and $r_{12}$, and a different number (zero) of reconstruction elements associated with signal elements from the second row of signal elements of the input data 502. $A_2$ is derived from two reconstruction elements associated with signal elements from the second row of signal elements of the input data 502, namely $r_{21}$ and $r_{22}$, and a different number (zero) of reconstruction elements associated with signal elements from the first row of signal elements of the input data 502.

In a similar manner to that described above with reference to FIG. 2, delta averages, $\Delta A_1$ and $\Delta A_2$, associated with $A_1$ and $A_2$, are derived. In this example, $$\Delta A_1 := \left\{\left(\frac{1}{2}\sum_{j=1}^{2} I_{1j}\right) - D(I_{11}, I_{12})\right\},$$

and $$\Delta A_2 := \left\{\left(\frac{1}{2}\sum_{j=1}^{2} I_{2j}\right) - D(I_{21}, I_{22})\right\}.$$

It can be seen that $$A_1 = \Delta A_1 + D(I_{11}, I_{12}) - \left(\frac{1}{2}\sum_{j=1}^{2} u_{1j}\right)$$

and $$A_2 = \Delta A_2 + D(I_{21}, I_{22}) - \frac{1}{2}\left(\sum_{j=1}^{2} U_{2j}\right).$$

The derived delta averages, $\Delta A_1$ and $\Delta A_2$, may be transmitted by the encoder instead of $A_1$ and $A_2$, as the values of the delta averages are more likely to be zero or close to zero. Entropy encoding techniques may be more efficient when compressing a stream of numbers that include a higher percentage of values equal to zero. By transmitting the delta averages, $\Delta A_1$ and $\Delta A_2$, instead of $A_1$ and $A_2$, the encoded data elements are more likely to include a higher number of zero symbols, thus improving encoder efficiency and reducing the amount of data bits that are needed to encode such data elements.

Figure 6:
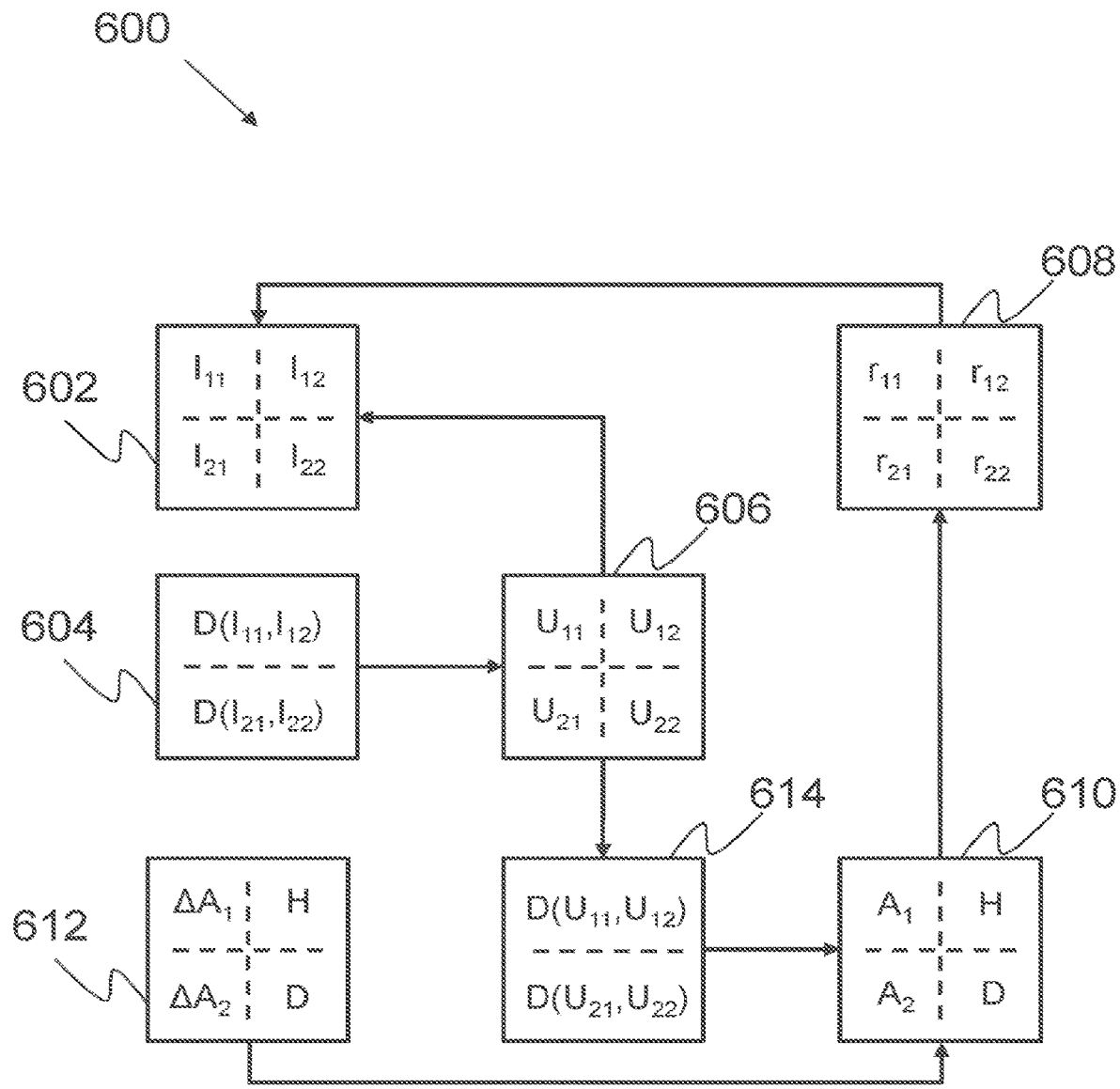
FIG. 6 shows schematically another example of a signal processing technique in accordance with an embodiment of the present invention.

Referring to FIG. 6, there is shown schematically an example of a signal processing technique 600. The signal processing technique 600 is performed by the decoder device 110.

In this example, the decoder device 110 receives data 604, $D(I_{11},I_{12})$ and $D(I_{21},I_{22})$, and the second set of data elements 612 from the encoder device 108. In other examples, the decoder device 110 receives data usable to reconstruct data 604, $D(I_{11},I_{12})$ and $D(I_{21},I_{22})$ and reconstructs data 604, $D(I_{11},I_{12})$ and $D(I_{21},I_{22})$, using the received data.

In this example, data 606 is generated by upsampling data 604. In this example, the upsampling operation performed by the decoder device 110 is in one direction only. In this specific example, the upsampling operation is in the horizontal direction only.

The upsampled data 606 is processed to generate further downsampled data 614 based on the upsampled data 606. In this example, the further downsampled data 614 is generated by downsampling the upsampled data 606. In this example, the downsampling operation performed by the decoder device 110 is the same as the downsampling operation performed by the encoder device 108, namely horizontal downsampling only. This involves calculating two average of the values of the signal elements $U_{11}$, $U_{12}$, $U_{21}$, $U_{22}$ in the upsampled data 606. In this example, the further downsampled data 614 is arranged as a 2×1 array including two elements, $D(U_{11},U_{12})$ and $D(U_{21},U_{22})$. As such, in this example, $$D(U_{11}, U_{12}) = \frac{1}{2}\sum_{j=1}^{2} U_{1j}$$

and $$D(U_{21}, U_{22}) = \frac{1}{2}\sum_{j=1}^{2} U_{2j}.$$

The second set of data elements 612 received from the encoder device 108 includes the delta averages, $\Delta A_1$ and $\Delta A_2$. Since $$A_1 = \Delta A_1 + \left\{ D(I_{11}, I_{12}) - \frac{1}{2}\sum_{j=1}^{2} U_{1j} \right\}$$

and $$D(U_{11}, U_{12}) = \frac{1}{2}\sum_{j=1}^{2} U_{1j},$$

then $A_1 = \Delta A_1 + D(I_{11},I_{12}) - D(U_{11},U_{12})$. Further, since $$A_2 = \Delta A_2 + \left\{ D(I_{21}, I_{22}) - \frac{1}{2}\sum_{j=1}^{2} U_{2j} \right\}$$

and $$D(U_{21}, U_{22}) = \frac{1}{2}\sum_{j=1}^{2} U_{2j},$$

then $A_2 = \Delta A_2 + D(I_{21},I_{22}) - D(U_{21}, U_{22})$.

Since the decoder device 110 received the delta averages, $\Delta A_1$ and $\Delta A_2$, and $D(I_{11},I_{12})$ and $D(I_{21},I_{22})$ from the encoder device 108 and has derived $D(U_{11},U_{12})$ and $D(U_{21},U_{22})$ itself, the decoder device 110 can calculate the average values, $A_1$ and $A_2$. As such, the decoder device 110 can derive the first set of data elements 610.

The decoder device 110 derives the set of reconstruction elements 608 by pre-multiplying the first set of data elements 610 with the inverse of the transformation matrix, $K^{-1}$, namely:

$$K^{-1} = \begin{bmatrix} 1 & 1 & 0 & 1 \\ 1 & -1 & 0 & -1 \\ 0 & 1 & 1 & -1 \\ 0 & -1 & 1 & 1 \end{bmatrix}.$$

Using eq. 2 above:

$$\begin{bmatrix} 1 & 1 & 0 & 1 \\ 1 & -1 & 0 & -1 \\ 0 & 1 & 1 & -1 \\ 0 & -1 & 1 & 1 \end{bmatrix} \cdot \begin{bmatrix} A \\ H \\ V \\ D \end{bmatrix} = \begin{bmatrix} 1 & 1 & 0 & 1 \\ 1 & -1 & 0 & -1 \\ 0 & 1 & 1 & -1 \\ 0 & -1 & 1 & 1 \end{bmatrix} \cdot \frac{1}{4}\begin{bmatrix} 2 & 2 & 0 & 0 \\ 1 & -1 & 1 & -1 \\ 0 & 0 & 2 & 2 \\ 1 & -1 & -1 & 1 \end{bmatrix} \cdot \begin{bmatrix} r_{11} \\ r_{12} \\ r_{21} \\ r_{22} \end{bmatrix}.$$

Since pre-multiplying the transformation matrix K by its inverse $K^{-1}$ gives the identity matrix:

$$\begin{bmatrix} 1 & 1 & 0 & 1 \\ 1 & -1 & 0 & -1 \\ 0 & 1 & 1 & -1 \\ 0 & -1 & 1 & 1 \end{bmatrix} \cdot \begin{bmatrix} A_1 \\ H \\ A_2 \\ D \end{bmatrix} = \begin{bmatrix} r_{11} \\ r_{12} \\ r_{21} \\ r_{22} \end{bmatrix}$$

As such, $r_{11} = A_1 + H + D$, $r_{12} = A_1 - H - D$, $r_{21} = A_2 + H - D$ and $r_{22} = A_2 - H + D$.

The decoder device 110 can recover the input data 602 using the equation $I_{ij} = U_{ij} + r_{ij}$ since all of the values $U_{ij}$ and $r_{ij}$ are known to the decoder device 110.

Figure 7:
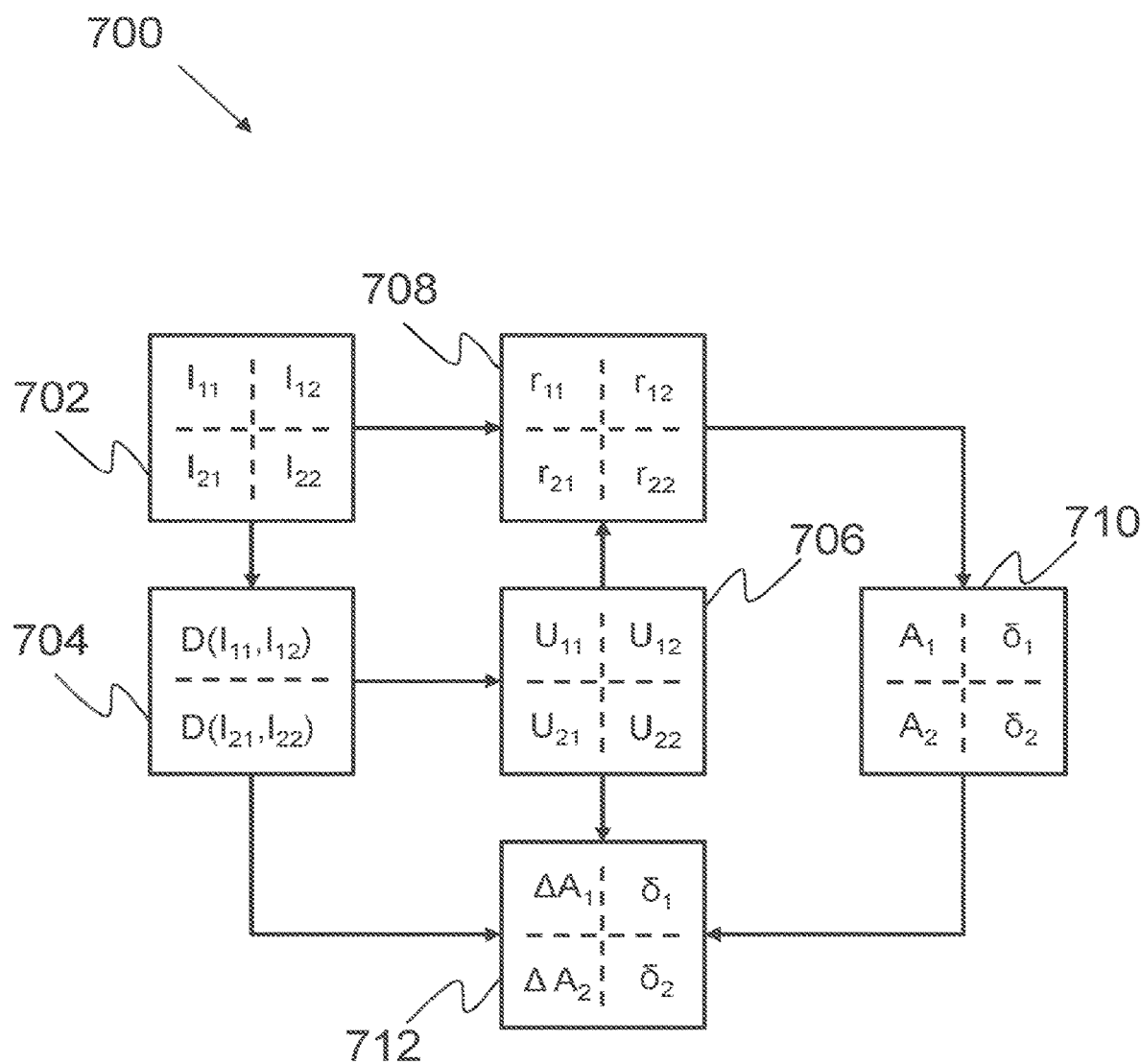
FIG. 7 shows schematically another example of a signal processing technique in accordance with an embodiment of the present invention.

Referring to FIG. 7, there is shown schematically an example of a signal processing technique 700. The signal processing technique 700 is performed by the encoder device 108.

The first set of data elements 710 may be derived by pre-multiplying the set of reconstruction elements 708 with a transformation matrix, K, where:

$$K = \frac{1}{4}\begin{bmatrix} 2 & 2 & 0 & 0 \\ 2 & -2 & 0 & 0 \\ 0 & 0 & 2 & 2 \\ 0 & 0 & 2 & -2 \end{bmatrix}$$

As such, $$\begin{bmatrix} A_1 \\ \delta_1 \\ A_2 \\ \delta_2 \end{bmatrix} = \frac{1}{4}\begin{bmatrix} 2 & 2 & 0 & 0 \\ 2 & -2 & 0 & 0 \\ 0 & 0 & 2 & 2 \\ 0 & 0 & 2 & -2 \end{bmatrix} \cdot \begin{bmatrix} r_{11} \\ r_{12} \\ r_{21} \\ r_{22} \end{bmatrix} \quad \text{(eq. 3)}$$

and $$A_1 = \frac{1}{4}(2 \cdot r_{11} + 2 \cdot r_{12}),$$

$$\delta_1 = \frac{1}{4}(2 \cdot r_{11} - 2 \cdot r_{12}), A_2 = \frac{1}{4}(2 \cdot r_{21} + 2 \cdot r_{22})$$

and $$\delta_2 = \frac{1}{4}(2 \cdot r_{21} - 2 \cdot r_{22}).$$

$\delta_1$ represents the difference between the first and second reconstruction elements associated with signal elements from the first row of signal elements of the input data 702. $\delta_2$ represents the difference between the first and second reconstruction elements associated with signal elements from the second row of signal elements of the input data 702.

Both $\delta_1$ and $\delta_2$ are derived from at least two reconstruction elements associated with signal elements from one row of signal elements of the input data 702 and a different number of reconstruction elements associated with signal elements from another row of signal elements of the input data 702. In particular, $\delta_1$ is derived from two reconstruction elements associated with signal elements from the first row of signal elements of the input data 702, namely $r_{11}$ and $r_{12}$, and a different number (zero) of reconstruction elements associated with signal elements from the second row of signal elements of the input data 702. $\delta_2$ is derived from two reconstruction elements associated with signal elements from the second row of signal elements of the input data 702, namely $r_{21}$ and $r_{22}$, and a different number (zero) of reconstruction elements associated with signal elements from the first row of signal elements of the input data 702.

Figure 8:
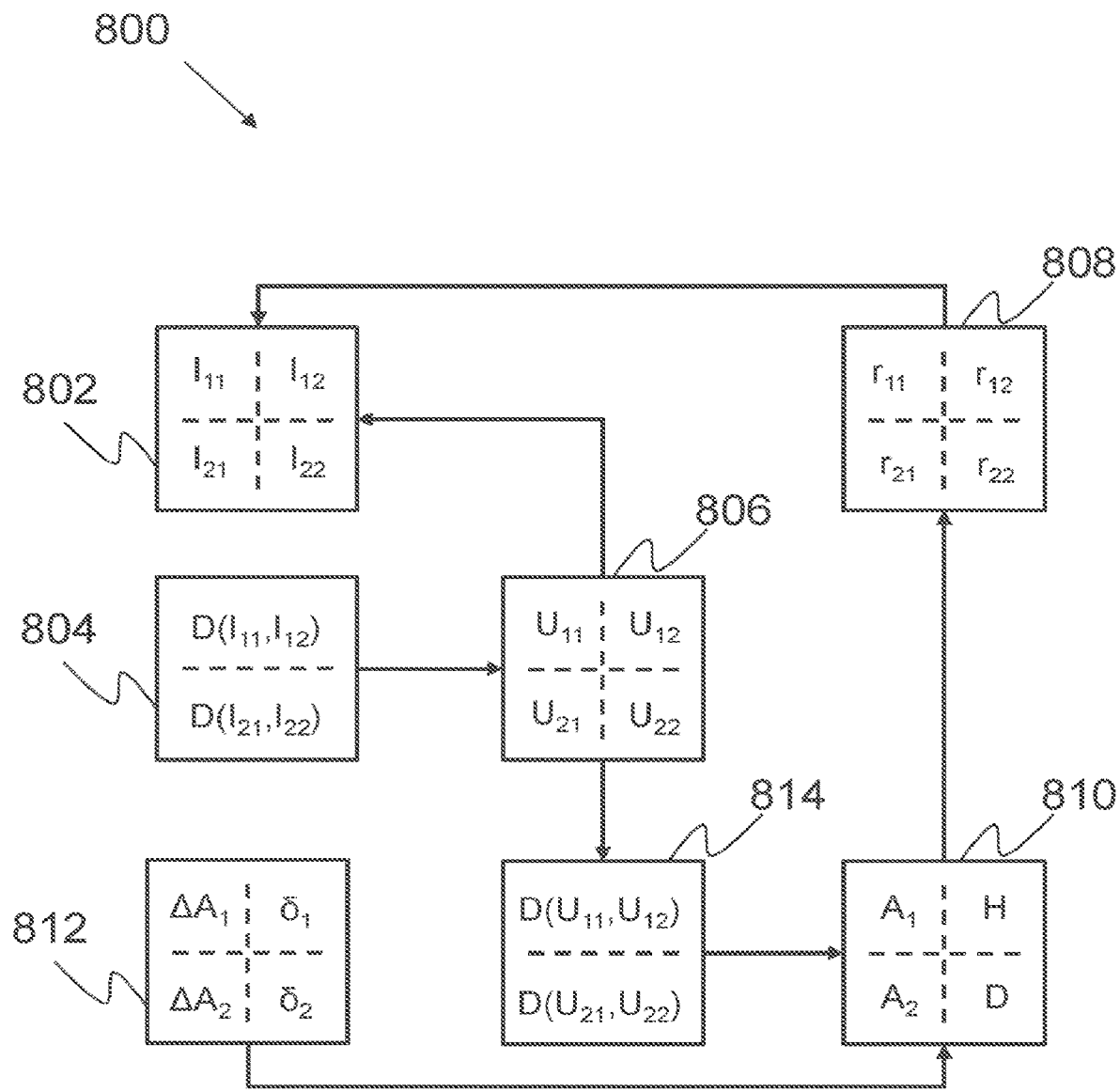
FIG. 8 shows schematically another example of a signal processing technique in accordance with an embodiment of the present invention.

Referring to FIG. 8, there is shown schematically an example of a signal processing technique 800. The signal processing technique 800 is performed by the decoder device 110.

In this example, the decoder device 110 receives downsampled data 804, $D(I_{11},I_{12})$ and $D(I_{21},I_{22})$, and the second set of data elements 812 from the encoder device 108.

Since the decoder device 110 received the delta averages, $\Delta A_1$ and $\Delta A_2$, and $D(I_{11},I_{12})$ and $D(I_{21},I_{22})$ from the encoder device 108 and has derived $D(U_{11},U_{12})$ and $D(U_{21},U_{22})$ itself, the decoder device 110 can calculate the average values, $A_1$ and $A_2$. Further, the decoder device 110 receives $\delta_1$ and $\delta_2$ in the second set of data elements 812. As such, the decoder device 110 can derive the first set of data elements 810 as described above.

The encoder device 110 derives the set of reconstruction elements 808 by pre-multiplying the first set of data elements 812 with the inverse of the transformation matrix, $K^{-1}$, namely:

$$K^{-1} = \begin{bmatrix} 1 & 1 & 0 & 0 \\ 1 & -1 & 0 & 0 \\ 0 & 0 & 1 & 1 \\ 0 & 0 & 1 & -1 \end{bmatrix}$$

Using eq. 3 above:

$$\begin{bmatrix} 1 & 1 & 0 & 0 \\ 1 & -1 & 0 & 0 \\ 0 & 0 & 1 & 1 \\ 0 & 0 & 1 & -1 \end{bmatrix} \cdot \begin{bmatrix} A_1 \\ \delta_1 \\ A_2 \\ \delta_2 \end{bmatrix} = \begin{bmatrix} 1 & 1 & 0 & 0 \\ 1 & -1 & 0 & 0 \\ 0 & 0 & 1 & 1 \\ 0 & 0 & 1 & -1 \end{bmatrix} \cdot \frac{1}{4} \begin{bmatrix} 2 & 2 & 0 & 0 \\ 2 & -2 & 0 & 0 \\ 0 & 0 & 2 & 2 \\ 0 & 0 & 2 & -2 \end{bmatrix} \cdot \begin{bmatrix} r_{11} \\ r_{12} \\ r_{21} \\ r_{22} \end{bmatrix}.$$

Since pre-multiplying the transformation matrix K by its inverse $K^{-1}$ gives the identity matrix:

$$\begin{bmatrix} 1 & 1 & 0 & 0 \\ 1 & -1 & 0 & 0 \\ 0 & 0 & 1 & 1 \\ 0 & 0 & 1 & -1 \end{bmatrix} \cdot \begin{bmatrix} A_1 \\ \delta_1 \\ A_2 \\ \delta_2 \end{bmatrix} = \begin{bmatrix} r_{11} \\ r_{12} \\ r_{21} \\ r_{22} \end{bmatrix}$$

As such, $r_{11}=A_1+\delta_1$, $r_{12}=A_1-\delta_1$, $r_{21}=A_2+\delta_2$ and $r_{22}=A_2-\delta_2$.

The decoder device 110 can recover the input data 802 using the equation $I_{ij}=U_{ij}+r_{ij}$ since all of the values $U_{ij}$ and $r_{ij}$ are known to the decoder device 110.

Figure 9A:
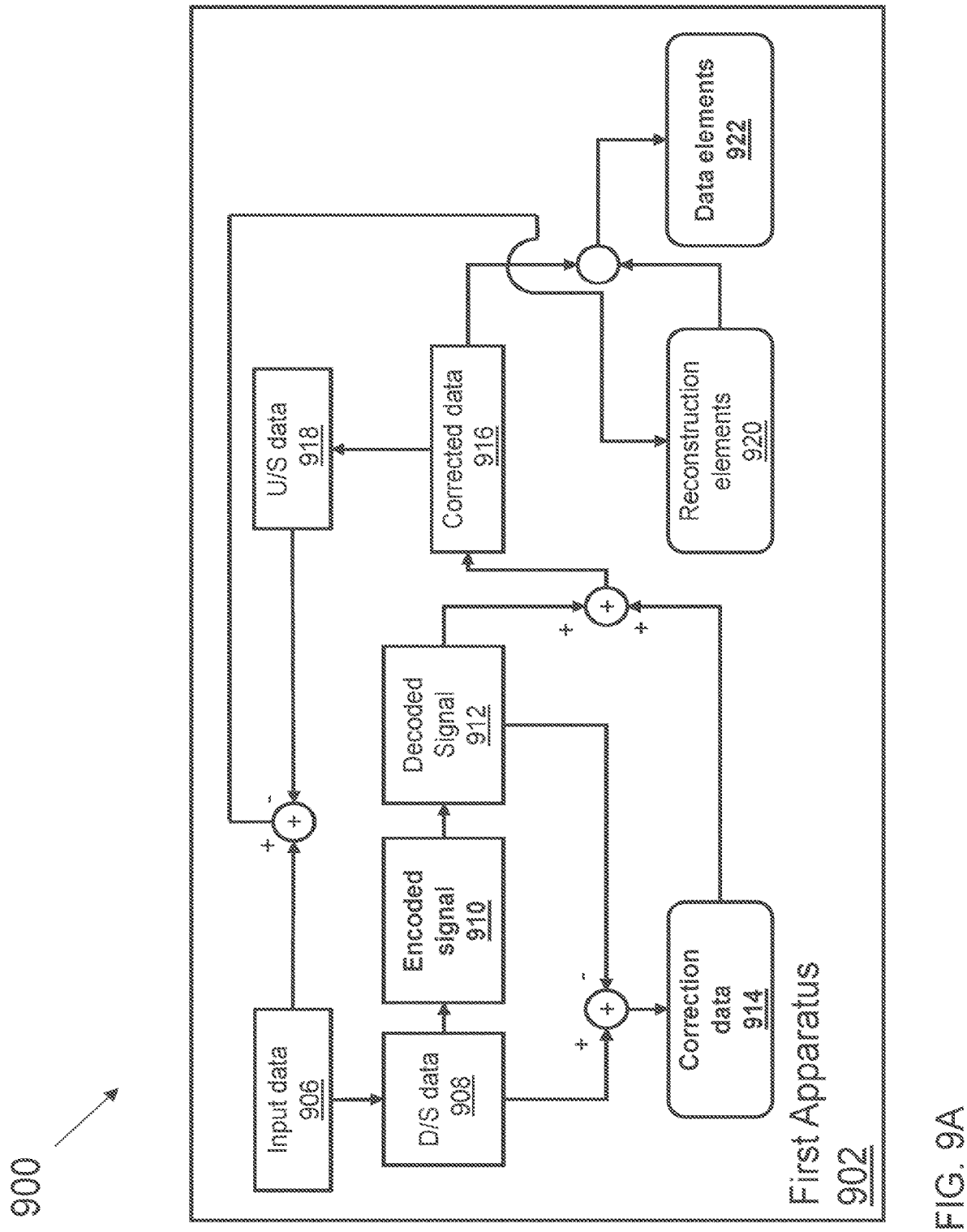
FIGS. 9A and 9B show a schematic block diagram of another example of a signal processing system in accordance with an embodiment of the present invention.
Figure 9B:
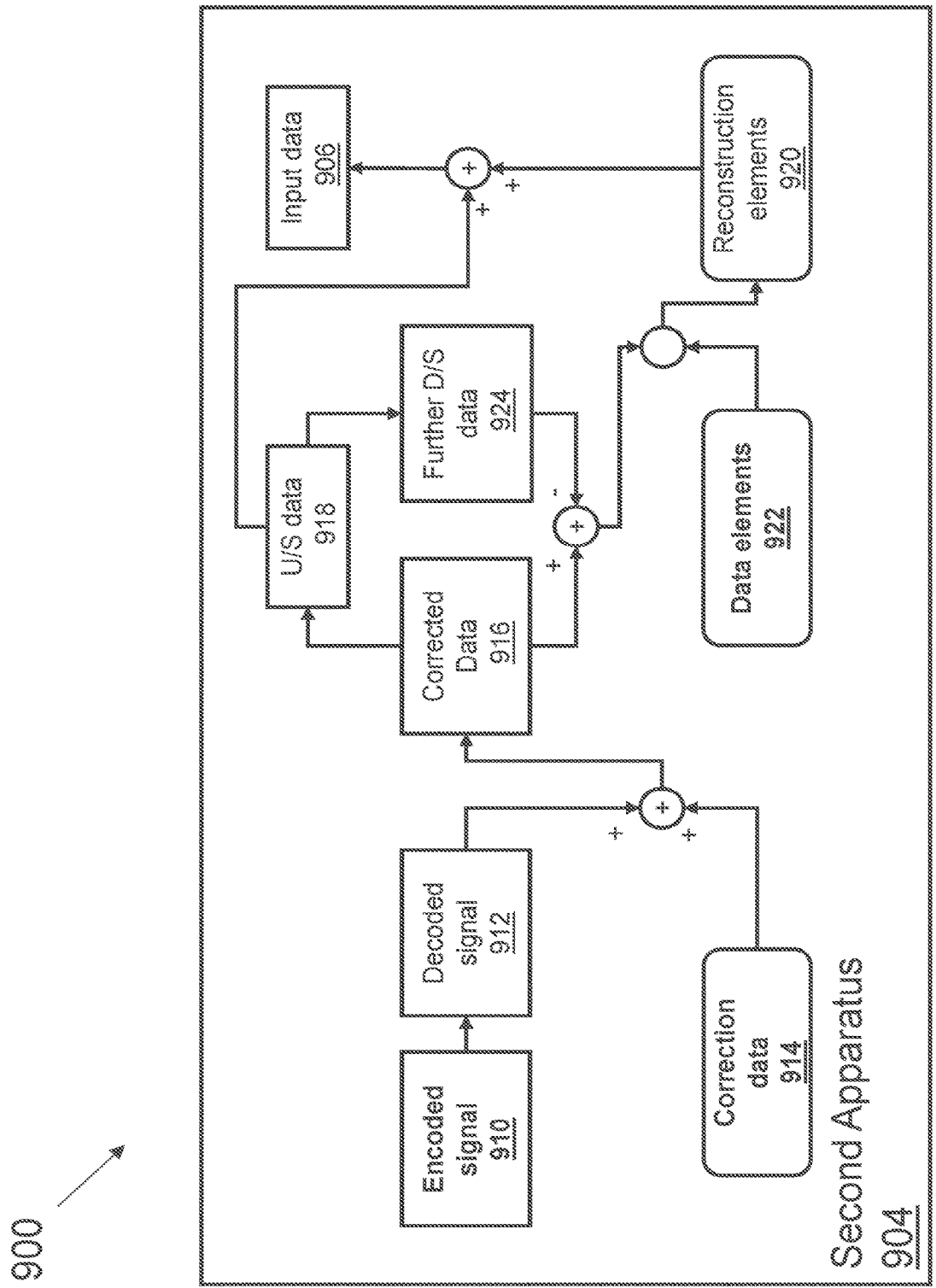

Referring to FIGS. 9A and 9B, there is shown schematically an example of a signal processing system 900. The signal processing system 900 includes a first apparatus 902 comprising an encoder device and a second apparatus 904 comprising a decoder device. In each of the first apparatus 902 and the second apparatus 904, items are shown on three levels. Items on the first, highest level relate to data at a relatively high level of quality. Items on the second, intermediate level relate to data at a relatively low level of quality. Items on the third, lowest level relate to additional data.

Referring first to FIG. 9A, the first apparatus 902 obtains a representation of a signal at a relatively high level of quality 906. The representation of the signal at a relatively high level of quality 906 will be referred to as "input data" hereinafter. The signal may be a video signal. The video signal may be an interlaced video signal. The video signal may be a progressive video signal. The representation of the signal at the relatively high level of quality 906 is arranged as an array of signal elements comprising at least first and second rows of signal elements. The first apparatus 902 may receive the input data 906. For example, the first apparatus 902 may receive the input data 906 from at least one other apparatus.

The first apparatus 902 derives data 908 based on the input data 906. In this example, the data 908 based on the input data 906 is a preliminary representation 908 of the signal at the relatively low level of quality, derived by performing a downsampling operation on the input data 906. The data 908 based on the input data 906 will be referred to as "downsampled data" hereinafter. The downsampling operation may be a one-dimensional downsampling operation. For example, the downsampling operation may be performed in a horizontal direction only. The downsampling operation may be a multi-dimensional downsampling operation. For example, the downsampling operation may be performed in both the horizontal and vertical directions. The downsampling operation may be performed by performing an averaging operation. In other examples, the data 908 based on the input data 906 is derived by performing an operation other than a downsampling operation on the input data 906.

The downsampled data 908 is encoded to produce an encoded signal 910 at the relatively low level of quality. In some examples, the first apparatus 902 encodes the downsampled data 908 to produce the encoded signal 910 at the relatively low level of quality. The first apparatus 902 may output the encoded signal 910, for example for transmission to the second apparatus 904. In other examples, the first apparatus 902 outputs data useable to derive the encoded signal 910 at the relatively low level of quality. The data useable to derive the encoded signal 910 may comprise the downsampled data 908. The encoded signal 910 may be produced by a separate encoding device. The encoded signal may be an H.264 encoded signal.

The encoded signal 910 at the relatively low level of quality is decoded to produce a decoded signal 912 at the relatively low level of quality. In some examples, the first apparatus 902 decodes the encoded signal 910 at the relatively low level of quality to produce the decoded signal 912 at the relatively low level of quality. In other examples, the first apparatus 902 receives the decoded signal 912 at the relatively low level of quality, for example from a separate encoding and/or decoding device. The encoded signal 910 may be decoded using an H.264 decoder.

The first apparatus 902 obtains correction data 914 useable to derive a representation 916 of the signal at the relatively low level of quality from the decoded signal 912. The first apparatus 902 may generate the correction data 914 based on a comparison between the downsampled data 908 and the decoded signal 912. The correction data 914 can be used to correct for errors introduced in encoding and decoding the downsampled data 908.

The first apparatus 902 outputs data useable to derive the correction data 914, for example for transmission to the second apparatus 904.

The first apparatus 902 corrects the decoded signal 912 using the correction data 914 to derive the representation 916 of the signal at the relatively low level of quality. The representation 916 of the signal at the relatively low level of quality will be referred to as "corrected downsampled data" hereinafter. Since the correction data 914 corrects for errors introduced in encoding and decoding the downsampled data 908, in some examples the first apparatus 902 uses the downsampled data 908 as the corrected downsampled data 916. The downsampled data 908 may therefore be the same as the corrected downsampled data 916. In this example, however, the first apparatus 902 derives the corrected downsampled data 916 based at least in part on the downsampled data 908.

The first apparatus 902 obtains data 918 based on the corrected downsampled data 916. In this example, the data 918 based on the corrected downsampled data 916 is a preliminary representation of the signal at the relatively high level of quality. In this example, the first apparatus 902 derives the data 918 based on the corrected downsampled data 916 by performing an upsampling operation on the corrected downsampled data 916. The data 918 based on the corrected downsampled data 916 will be referred to hereinafter as "upsampled data".

The first apparatus 902 may perform the upsampling operation by performing a one-dimensional upsampling operation on the corrected downsampled data 916. For example, the first apparatus 902 may perform the upsampling operation in a horizontal direction only.

The first apparatus 902 may perform the upsampling operation by performing a multi-dimensional upsampling operation. For example, the first apparatus 902 may perform the upsampling operation in both a horizontal and a vertical direction. The first apparatus 902 may perform the upsampling operation by performing a Nearest Neighbour operation. In some examples, the first apparatus 902 performs the upsampling operation by performing a bilinear, bicubic and/or any other upsampling operation.

The corrected downsampled data 916 may comprise a first plurality of signal elements arranged in a first plurality of rows. The upsampled data 918 may comprise a second plurality of signal elements arranged in a second plurality of rows. The number of the first plurality of rows may be the same as the number of the second plurality of rows. The number of the first plurality of rows may be the same as the number of the second plurality of rows where the upscaling operation is performed in a horizontal direction only.

The first apparatus 902 may use a given element in a given row in the corrected downsampled data 916 to derive a plurality of elements in a corresponding row in the upsampled data 918. For example, an element in the first row in the corrected downsampled data 916 may be used to derive multiple elements in the first row in the upsampled data 918 where the upscaling operation is performed in a horizontal direction.

The first apparatus 902 obtains a set of reconstruction elements 920. The set of reconstruction elements is useable to reconstruct the input data 906 using the upsampled data 918. A reconstruction element in the set of reconstruction elements 920 is associated with a respective signal element in the input data 906.

The first apparatus 902 may generate the set of reconstruction elements 920 based on a comparison between the input data 906 and the upsampled data 918.

The first apparatus 902 derives a set of data elements 922 based on the set of reconstruction elements 920. At least one data element in the set of data elements is derived from a plurality of reconstruction elements in the set of reconstruction elements 902. At least one data element in the set of data elements 922 is derived from: at least two reconstruction elements associated with signal elements from the first row of signal elements in the input data 906; and a different number of reconstruction elements associated with signal elements from the second row of signal elements in the input data 906. The different number may be zero. The at least one data element in the set of data elements 922 may be derived from two reconstruction elements associated with signal elements from the first row of signal elements in the input data 906 and zero reconstruction elements associated with signal elements from the second row of signal elements in the input data 906.

In some examples, the different number is not zero. For example, the different number may be one. The at least one data element in the set of data elements 922 may be derived from two reconstruction elements associated with signal elements from the first row of signal elements in the input data 906 and one reconstruction element associated with signal elements from the second row of signal elements in the input data 906. In this example, a transformation matrix, K, may be used to derive the set of data elements 922 from the set of reconstruction elements 902, where $$K = \frac{1}{4}\begin{bmatrix} 1 & 1 & 0 & 2 \\ 1 & -1 & 0 & -2 \\ 0 & -2 & 1 & 1 \\ 0 & 2 & 1 & -1 \end{bmatrix}.$$

The set of reconstruction elements 902 may then be reproduced using the inverse of the transformation matrix, $K^{-1}$, namely:

$$K^{-1} = \begin{bmatrix} 2 & 2 & 0 & 0 \\ 0.4 & -0.4 & -0.8 & 0.8 \\ 0 & 0 & 2 & 2 \\ 0.8 & -0.8 & 0.4 & -0.4 \end{bmatrix}.$$

At least one data element in the set of data elements 922 may be derived by determining an average of either: at least two reconstruction elements associated with signal elements from the first row of signal elements in the input data 906; or at least two reconstruction elements associated with signal elements from the second row of signal elements in the input data 906.

At least one data element in the set of data elements 922 may be derived by determining a measure of a difference between either: at least two reconstruction elements associated with signal elements from the first row of signal elements in the input data 906; or at least two reconstruction elements associated with signal elements from the second row of signal elements in the input data 906.

The set of data elements 922 may comprise a set of transformed data elements. The first apparatus may retrieve a transformation matrix and derive the set of transformed elements based on a pre-multiplication of the set of reconstruction elements 920 by the transformation matrix. At least one element of the transformation matrix may have a value of zero. At least one row of the transformation matrix may comprise at least two adjacent elements having values of zero. The at least two elements may be adjacent horizontally or vertically.

The first apparatus 902 may derive a set of correlation elements based at least in part on the set of transformed elements and the upsampled data 918.

The first apparatus 902 may derive at least one delta average value based on a difference between an average of at least some of the signal elements in the input data 906 and an average of at least some of the signal elements in the downsampled data 908.

Turning now to FIG. 9B, the second apparatus 904 receives data useable to derive the representation 916 of the signal at the relatively low level of quality and the set of data elements 922.

The second apparatus 904 may receive the encoded signal 910 at the relatively low level of quality, decode the encoded signal 910 at the relatively low level of quality to produce a decoded signal 912 at the relatively low level of quality, and obtain correction data 914 useable with the decoded signal 912 at the relatively low level of quality to derive the corrected downsampled data 916. In some examples, the encoded signal 910 at the relatively low level of quality is decoded by a separate decoding device. The second apparatus 904 may correct the decoded signal 912 at the relatively low level of quality using the correction data 914 to derive the corrected downsampled data 916. The encoded signal 910 at the relatively low level of quality may be decoded using an H.264 decoder.

At least one data element in the set of data elements 922 is associated with at least two reconstruction elements associated with signal elements from the first row of signal elements in the input data 906 and a different number of reconstruction elements associated with signal elements from the second row of signal elements in the input data 906. The different number may be zero. The at least one data element in the set of data elements 922 may be indicative of two reconstruction elements associated with signal elements from the first row of signal elements in the input data 906 and zero reconstruction elements associated with signal elements from the second row of signal elements in the input data 906.

At least one data element in the set of data elements 922 may be indicative of an average of either: at least two reconstruction elements associated with signal elements from the first row of signal elements in the input data 906; or at least two reconstruction elements associated with signal elements from the second row of signal elements in the input data 906.

At least one data element in the set of data elements 922 may be indicative of a measure of a difference between either: at least two reconstruction elements associated with signal elements from the first row of signal elements in the input data 906; or at least two reconstruction elements associated with signal elements from the second row of signal elements in the input data 906.

The second apparatus 904 obtains the set of reconstruction elements 920 based at least in part on the set of data elements 922. The set of reconstruction elements is useable to reconstruct the input data 906 using the upsampled data 918. A reconstruction element in the set of reconstruction elements 920 is associated with a respective signal element in the input data 906. The set of reconstruction elements 920 is indicative of a comparison between the input data 906 and the upsampled data 918.

The second apparatus 904 may retrieve an inverse of a transformation matrix and derive the set of reconstruction elements 920 based on a pre-multiplication of a set of transformable elements by the inverse of the transformation matrix. The set of data elements 922 may comprise the set of transformable elements.

The set of data elements 922 may comprise a set of correlation elements. The second apparatus 904 may be configured to derive the set of transformable elements based at least in part on the set of correlation elements, at least one transformable element in the set of transformable elements being based on the representation of the signal at the relatively low level of quality.

The second apparatus 904 may receive data useable to derive at least one delta average value. The at least one delta average value may be based on a difference between: an average of at least some of the signal elements in the input data 906; and an average of at least some of the signal elements in the downsampled data 908.

The input data 906 is arranged as an array of signal elements comprising at least first and second rows of signal elements.

The upsampled data 918 may be a preliminary representation of the input data 906 derived by performing an upsampling operation on the corrected downsampled data 916. The upsampling operation may be a one-dimensional upsampling operation. For example, the one-dimensional upsampling operation may be performed in the horizontal direction only. The upsampling operation may be a multi-dimensional upsampling operation. For example, the upsampling operation may be performed in both the horizontal and vertical directions. The upsampling operation may be performed by performing a Nearest Neighbour operation. In some examples, the upsampling operation is performed by performing a bilinear, bicubic and/or any other upsampling operation.

The corrected downsampled data 916 may comprise a first plurality of signal elements arranged in a first plurality of rows, the upsampled data 918 may comprise a second plurality of signal elements arranged in a second plurality of rows, and the number of the first plurality of rows may be the same as the number of the second plurality of rows. The second apparatus 904 may use a given signal element in a given row in the corrected downsampled data 916 to derive a plurality of signal elements in a corresponding row in the upsampled data 918.

The second apparatus 904 may derive the set of reconstruction elements 920 based at least in part on data 924 based on the upsampled data 918. The data 924 based on the upsampled data 918 may be a further preliminary representation of the signal at the relatively low level of quality derived by performing a downsampling operation on the upsampled data 918. The data 924 based on the upsampled data 918 is referred to hereinafter as "further downsampled data" for ease of explanation. The downsampling operation may be a one-dimensional downsampling operation. For example, the downsampling operation may be in a horizontal direction only. The downsampling operation may be a multi-dimensional downsampling operation. For example, the downsampling operation may be in both the horizontal and vertical directions. Performing the downsampling operation may involve performing an averaging operation.

The second apparatus 904 recovers the reconstruction elements 920 using the received data elements 922 and data derived from: the corrected downsampled data 916 and the further downsampled data 924. The data derived from the corrected downsampled data 916 and the further downsampled data 924 may be considered to constitute a predicted average value, $A_P$, as described above. The predicted average value is used with the received data elements 922 to recover the reconstruction elements 920. The second apparatus 904 reconstructs the input data 906 based at least in part on the corrected downsampled data 916 and the set of reconstruction elements 920.

Figure 10:
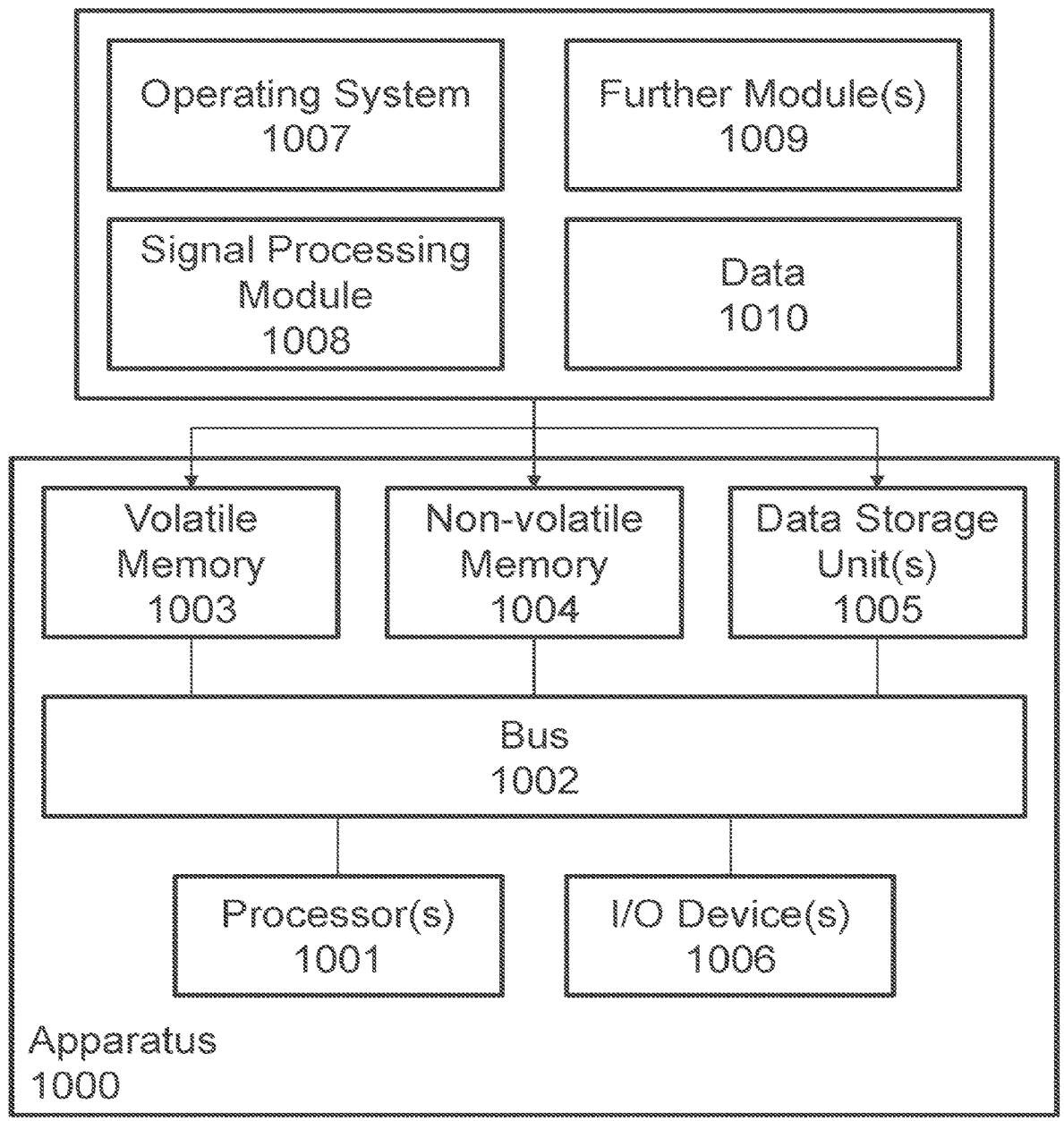
FIG. 10 shows a schematic block diagram of an example of an apparatus in accordance with an embodiment of the present invention.

Referring to FIG. 10, there is shown a schematic block diagram of an example of an apparatus 1000.

In an example, the apparatus 1000 comprises a decoder device. In another example, the apparatus 1000 comprises an encoder device.

Other examples of apparatus 1000 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, a peripheral device such as a switch, modem, router, etc., or in general any type of computing or electronic device.

In this example, the apparatus 1000 comprises one or more processors 1001 configured to process information and/or instructions. The one or more processors 1001 may comprise a central processing unit (CPU). The one or more processors 1001 are coupled with a bus 1002. Operations performed by the one or more processors 1001 may be carried out by hardware and/or software. The one or more processors 1001 may comprise multiple co-located processors or multiple disparately located processors.

In this example, the apparatus 1000 comprises computer-useable volatile memory 1003 configured to store information and/or instructions for the one or more processors 1001. The computer-useable volatile memory 1003 is coupled with the bus 1002. The computer-useable volatile memory 1003 may comprise random access memory (RAM).

In this example, the apparatus 1000 comprises computer-useable non-volatile memory 1004 configured to store information and/or instructions for the one or more processors 1001. The computer-useable non-volatile memory 1004 is coupled with the bus 1002. The computer-useable non-volatile memory 1004 may comprise read-only memory (ROM).

In this example, the apparatus 1000 comprises one or more data-storage units 1005 configured to store information and/or instructions. The one or more data-storage units 1005 are coupled with the bus 1002. The one or more data-storage units 1005 may for example comprise a magnetic or optical disk and disk drive or a solid-state drive (SSD).

In this example, the apparatus 1000 comprises one or more input/output (I/O) devices 1006 configured to communicate information to and/or from the one or more processors 1001. The one or more I/O devices 1006 are coupled with the bus 1002. The one or more I/O devices 1006 may comprise at least one network interface. The at least one network interface may enable the apparatus 1000 to communicate via one or more data communications networks. Examples of data communications networks include, but are not limited to, the Internet and a Local Area Network (LAN). The one or more I/O devices 1006 may enable a user to provide input to the apparatus 1000 via one or more input devices (not shown). The one or more input devices may include for example a remote control, one or more physical buttons etc. The one or more I/O devices 1006 may enable information to be provided to a user via one or more output devices (not shown). The one or more output devices may for example include a display screen.

Various other entities are depicted for the apparatus 1000. For example, when present, an operating system 1007, signal processing module 1008, one or more further modules 1009, and data 1010 are shown as residing in one, or a combination, of the computer-usable volatile memory 1003, computer-usable non-volatile memory 1004 and the one or more data-storage units 1005. The signal processing module 1008 may be implemented by way of computer program code stored in memory locations within the computer-usable non-volatile memory 1004, computer-readable storage media within the one or more data-storage units 1005 and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 1000 may therefore comprise a signal processing module 1008 which can be executed by the one or more processors 1001. The signal processing module 1008 can be configured to include instructions to implement at least some of the operations described herein. During operation, the one or more processors 1001 launch, run, execute, interpret or otherwise perform the instructions in the signal processing module 1008.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the apparatus 1000 may comprise more, fewer and/or different components from those depicted in FIG. 10.

The apparatus 1000 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

The above embodiments are to be understood as illustrative examples of the invention. Further embodiments of the invention are envisaged.

In examples described above, the encoder device 108 outputs data useable to derive the second set of data elements. The decoder device 110 uses the second set of data elements to derive the first set of data elements. In other examples, the encoder device 108 outputs data useable to derive the first set of data elements and the decoder device 110 derives the first set of data elements without first deriving or obtaining the second set of data elements.

In examples described above, the representation of the signal at the relatively high level of quality is arranged as an array of signal elements comprising at least first and second rows of signal elements. At least one data element in the set of data elements is derived from: at least two reconstruction elements associated with signal elements from the first row of signal elements in the representation of the signal at the relatively high level of quality; and a different number of reconstruction elements associated with signal elements from the second row of signal elements in the representation of the signal at the relatively high level of quality. In other examples, the representation of the signal at the relatively high level of quality is arranged as an array of signal elements comprising at least first and second columns of signal elements. At least one data element in the set of data elements is derived from: at least two reconstruction elements associated with signal elements from the first column of signal elements in the representation of the signal at the relatively high level of quality; and a different number of reconstruction elements associated with signal elements from the second column of signal elements in the representation of the signal at the relatively high level of quality. Such an example may be used for example where the correlation between vertically adjacent signal elements in the representation of the signal at the relatively high level of quality is relatively strong and the correlation between horizontally adjacent signal elements in the representation of the signal at the relatively high level of quality is relatively weak.

In examples described above, the representation of the signal at the relatively high level of quality is arranged as an array of signal elements comprising a first and a second row of signal elements. At least one data element in the set of data elements may be derived from: at least two reconstruction elements associated with signal elements from the first row of signal elements in the representation of the signal at the relatively high level of quality; and a different number of reconstruction elements associated with signal elements from the second row of signal elements in the representation of the signal at the relatively high level of quality. In some examples, the first row of signal elements in the representation of the signal at the relatively high level of quality is adjacent to the second row of signal elements in the representation of the signal at the relatively high level of quality. In other examples, the first row of signal elements is not adjacent to the second row of signal elements. For example, the first row of signal elements and the second row of signal elements may be separated by a third row of signal elements. At least one data element in the set of data elements may be derived from reconstruction elements associated with signal elements from alternating rows of signal elements. In some examples, the array of signal elements comprises more than two rows of signal elements. At least one data element in the set of data elements may be derived from reconstruction elements associated with signal elements from more than two rows of signal elements.

In some examples the encoder device 108 selects a transformation matrix from a plurality of candidate transformation matrices. The plurality of candidate transformation matrices have the same dimensions as each other, for example 4×4. The encoder device 108 performs an operation using a set of reconstruction elements and the selected transformation matrix to derive the set of data elements. The operation comprises multiplying the set of reconstruction elements and the selected transformation matrix together. The transformation matrix may be selected based on one or more attributes associated with the signal. For example, if the signal is a video signal, an attribute is an indication of whether the video signal is a progressive or an interlaced video signal. In some examples the encoder device 108 performs an analysis of all or part of the signal. The analysis may comprise determining a level of horizontal and/or vertical correlation in the signal. The encoder device 108 may select a transformation matrix from a plurality of candidate transformation matrices based on the outcome of the analysis. The encoder device 108 may perform such an analysis on a given signal at several points in time. In some examples, the encoder device 108 selects a first transformation matrix for use with a given signal at a first point in time and selects a second, different transformation matrix for use with the given signal at a second point in time. Additionally or alternatively, the encoder device 108 may select the first transformation matrix for use with a first part of the given signal and may select the second transformation matrix for use with a second, different part of the given signal. The first and the second parts of the given signal may correspond to different spatial and/or temporal regions in an image. Data identifying a selected transformation matrix may be outputted for transmission to at least one other apparatus, for example the decoder device 110. In some examples, data identifying the inverse of the selected transformation matrix is outputted for transmission to the at least one other apparatus. By selecting a transformation matrix from a plurality of transformation matrices having the same dimensions as each other, a single data processing framework may be used. The values of one or more elements of a given transformation matrix may be different compared to the corresponding elements in another transformation matrix, but the form of the data itself may not be changed. Selecting transformation matrices which have elements of different values may be used to influence the contributions of different rows of signal elements when deriving transformation and/or correlation elements for encoding and transmission.

The decoder device 110 may then select an inverse transformation matrix from a plurality of inverse transformation matrices and perform an operation using the set of data elements and the selected inverse transformation matrix to obtain the set of reconstruction elements. The decoder device 110 may receive data identifying a selected transformation matrix and/or a selected inverse transformation matrix from at least one other apparatus, for example, the encoder device 108. The operation may comprise multiplying the set of data elements and the selected inverse transformation matrix together. The inverse transformation matrix may be selected based on one or more attributes associated with the signal. For example, if the signal is a video signal, an attribute may be an indication of whether the video signal is a progressive or an interlaced video signal. In some examples the decoder device 110 performs an analysis of all or part of the signal. The analysis may comprise determining a level of horizontal and/or vertical correlation in the signal. The decoder device 110 may select an inverse transformation matrix from a plurality of candidate inverse transformation matrices based on the outcome of the analysis. The decoder device 110 may perform such an analysis on a given signal at several points in time. In some examples, the decoder device 110 selects a first inverse transformation matrix for use with a given signal at a first point in time and selects a second, different inverse transformation matrix for use with the given signal at a second point in time. Additionally or alternatively, the decoder device 110 may select the first inverse transformation matrix for use with a first part of the given signal and may select the second inverse transformation matrix for use with a second, different part of the given signal. The first and the second parts of the given signal may correspond to different spatial and/or temporal regions in an image. In some examples, the encoder device 108 and the decoder device 110 cooperatively select one or more transformation matrices and/or one or more inverse transformation matrices to apply to a given signal.

In examples described above, a first set of data elements (referred to herein as "transformed elements") is derived from reconstruction elements corresponding to a 2×2 array of signal elements. The set of transformed elements is derived by performing a transformation operation on the reconstruction elements.

In examples described above, a second set of data elements (referred to herein as "correlation elements") may also be derived.

In some examples, a third set of data elements (referred to herein as "multi-level correlation elements") is derived based on the set of reconstruction elements, the set of transformed elements or the set of correlation elements. The set of multi-level correlation elements is based on correlation between reconstruction elements in the set of reconstruction elements. The set of multi-level correlation elements is indicative of correlation between different transformed elements in the set of transformed elements or between different correlation elements in the set of correlation elements. The set of multi-level correlation elements may thus exploit two levels of correlation, namely one between reconstruction elements and another between transformed elements or correlation elements. This may lead to more efficient encoding where there is strong correlation at both levels and also allows a fine-grained configuration of encoder settings. This facilitates more efficient and effective encoding, for example where the encoding takes into account the relative importance of the data elements being encoded.

The set of multi-level correlation elements may be derived from the set of reconstruction elements in two stages, each stage involving a transformation operation using a different transformation matrix.

In the first stage, a first 4×4 transformation matrix, $K_1$, is first applied to four sets of reconstruction elements, each set of reconstruction elements corresponding to a 2×2 array of signal elements. As such, $K_1$ is applied four times, once to each set of reconstruction elements. $K_1$ may comprise the following matrix, as described in more detail above:

$$K_1 = \frac{1}{4}\begin{bmatrix} 2 & 2 & 0 & 0 \\ 1 & -1 & 1 & -1 \\ 0 & 0 & 2 & 2 \\ 1 & -1 & -1 & 1 \end{bmatrix}.$$

Applying $K_1$ to the four 2×2 sets of reconstruction elements results in four sets of four transformed elements. At least one of the transformed elements in each set of transformed elements is derived from at least two reconstruction elements associated with signal elements from one row of signal elements and a different number of reconstruction elements associated with signal elements from another row of signal elements. $K_1$ may be referred to as a "1D" correlation transformation, in that it emphasises horizontal correlation over vertical correlation.

In the second stage, a second 4×4 transformation matrix, $K_2$, may be applied to each set of transformed elements. The second 4×4 transformation matrix, $K_2$, may comprise the following matrix:

$$K_2 = \frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

The second transformation matrix, $K_2$, may be referred to as a "2D" correlation transformation matrix, in that it treats horizontal and vertical correlation equally. Applying $K_2$ to the four sets of transformed elements results in four sets of multi-level correlation elements, each set of multi-level correlation elements comprising four multi-level correlation elements.

The first transformation matrix, $K_1$, and/or the second transformation matrix, $K_2$, may be different from those shown above.

In some examples, instead of $K_1$ and $K_2$ each being applied to four sets of four elements to derive four sets of multi-level correlation elements, a set of sixteen transformed elements is derived by applying a first 16×16 transformation matrix to a set of reconstruction elements corresponding to a 4×4 array of signal elements, and a set of sixteen multi-level correlation elements is then derived by applying a second 16×16 transformation matrix to the set of sixteen transformed elements. The 4×4 array of signal elements may be formed of four connected 2×2 arrays of signal elements. The first 16×16 transformation matrix may relate to a 1D correlation transformation and the second 16×16 transformation matrix may relate to a 2D correlation transformation.

In some examples, the set of multi-level correlation elements is derived from a set of reconstruction elements in a single stage. That is, the set of multi-level correlation elements may be derived from the set of reconstruction elements without deriving the set of transformed elements. In such examples, a third 16×16 transformation matrix is applied to a set of reconstruction elements corresponding to a 4×4 array of signal elements to derive a set of sixteen multi-level correlation elements. As such, applying the third 16×16 transformation matrix may be equivalent to an application of the first 16×16 transformation matrix followed by an application of the second 16×16 transformation matrix.

In some examples, the set of multi-level correlation elements is derived from the set of transformed elements or the set of correlation elements. In such examples, the second stage of the two-stage process described above is performed on the set of transformed elements or the set of correlation elements to derive the set of multi-level correlation elements. Namely, $K_2$ may be applied to four sets of four transformed elements or four sets of four correlation elements, or the second 16×16 transformation matrix may be applied to a set of sixteen transformed elements or a set of sixteen correlation elements.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An encoder that encodes signal data in a manner that attempts to reduce an amount of data that is transmitted to a decoder device via a data communications network, said encoder comprising:
one or more processors; and
one or more hardware storage devices that store instructions that are executable by the one or more processors to cause the encoder to:
obtain a set of reconstruction elements, the set of reconstruction elements being useable to reconstruct a representation of a signal at a first level of quality using data based on a representation of the signal at a second level of quality, the representation of the signal at the first level of quality being arranged as an array of signal elements comprising at least first and second rows of signal elements, wherein a reconstruction element in the set of reconstruction elements is associated with a respective signal element in the representation of the signal at the first level of quality;
derive a set of data elements based on the set of reconstruction elements, at least one data element in the set of data elements being derived from a plurality of reconstruction elements in the set of reconstruction elements;
output data useable to derive (i) the representation of the signal at the second level of quality and (ii) the set of data elements, wherein deriving the set of data elements comprises:
selecting a transformation matrix from a plurality of candidate transformation matrices having the same dimensions as each other; and
performing an operation using the set of reconstruction elements and the selected transformation matrix to derive the set of data elements, wherein the operation comprises multiplying the set of reconstruction elements and the selected transformation matrix together; and
transmit, via the data communications network, the output data to the decoder device or, alternatively, store the output data in the one or more hardware storage devices.

2. The encoder of claim 1, the encoder being configured to output data identifying the selected transformation matrix for transmission to the decoder device.

3. The encoder of claim 1, the encoder being configured to select the transformation matrix based on one or more attributes associated with the signal.

4. The encoder of claim 3, wherein the signal is a video signal, and wherein the one or more attributes indicate whether the video signal is a progressive video signal or an interlaced video signal.

5. A decoder that is configured to operate in conjunction with an encoder device so as to reduce an amount of data that is transmitted between the decoder and the encoder device, said decoder comprising:
one or more processors; and
one or more hardware storage devices that store instructions that are executable by the one or more processors to cause the decoder to:
receive, via a data communications network, data useable to derive (i) a representation of a signal at a second level of quality and (ii) a set of data elements;
obtain a set of reconstruction elements based at least in part on the set of data elements, the set of reconstruction elements useable to reconstruct a representation of the signal at a first level of quality using data based on the representation of the signal at the second level of quality, the representation of the signal at the first level of quality being arranged as an array of signal elements comprising at least first and second rows of signal elements, wherein a reconstruction element in the set of reconstruction elements is associated with a respective signal element in the representation of the signal at the first level of quality; and
reconstruct the representation of the signal at the first level of quality based at least in part on the representation of the signal at the second level of quality and the set of reconstruction elements, wherein deriving the set of data elements comprises:
selecting an inverse transformation matrix from a plurality of candidate inverse transformation matrices having the same dimensions as each other; and
performing an operation using the set of data elements and the selected inverse transformation matrix to derive the set of reconstruction elements, wherein the operation comprises multiplying the set of data elements and the selected inverse transformation matrix together.

6. The decoder of claim 5, the decoder being configured to receive data identifying the selected inverse transformation matrix from the encoder device.

7. The decoder of claim 5, the decoder being configured to select the inverse transformation matrix based on one or more attributes associated with the signal, wherein the signal is a video signal, and wherein the one or more attributes indicate whether the video signal is a progressive video signal or an interlaced video signal.

8. A method for encoding signal data in a manner that attempts to reduce an amount of data that is transmitted between an encoder device and a decoder device via a data communications network, said method being implemented by the encoder device and comprising:
obtaining a set of reconstruction elements, the set of reconstruction elements being useable to reconstruct a representation of a signal at a first level of quality using data based on a representation of the signal at a second level of quality, the representation of the signal at the first level of quality being arranged as an array of signal elements comprising at least first and second rows of signal elements, wherein a reconstruction element in the set of reconstruction elements is associated with a respective signal element in the representation of the signal at the first level of quality;
deriving a set of data elements based on the set of reconstruction elements, at least one data element in the set of data elements being derived from a plurality of reconstruction elements in the set of reconstruction elements; and outputting data useable to derive (i) the representation of the signal at the second level of quality and (ii) the set of data elements, wherein deriving the set of data elements comprises:
- selecting a transformation matrix from a plurality of candidate transformation matrices having the same dimensions as each other; and
- performing an operation using the set of reconstruction elements and the selected transformation matrix to derive the set of data elements, wherein the operation comprises multiplying the set of reconstruction elements and the selected transformation matrix together; and transmitting, via the data communications network, the output data to the decoder device or, alternatively, storing the output data.

9. The method of claim 8, the method comprising outputting data identifying the selected transformation matrix for transmission to the decoder device.

10. The method of claim 8, the method comprising selecting the transformation matrix based on one or more attributes associated with the signal, wherein the signal is a video signal and, wherein the one or more attributes indicate whether the video signal is a progressive video signal or an interlaced video signal.

11. The method of claim 8, the method comprising:
- selecting a first transformation matrix from the plurality of candidate transformation matrices for use with a first part of the signal; and
- selecting a second transformation matrix from the plurality of candidate transformation matrices for use with a second, different part of the signal.

12. A method for enabling an encoder device and a decoder device to operate in conjunction with one another so as to reduce an amount of data that is transmitted between the encoder device and the decoder device, said method being implemented by the decoder device and comprising:
- receiving, via a data communications network, data useable to derive (i) a representation of a signal at a second level of quality and (ii) a set of data elements;
- obtaining a set of reconstruction elements based at least in part on the set of data elements, the set of reconstruction elements useable to reconstruct a representation of the signal at a first level of quality using data based on the representation of the signal at the second level of quality, the representation of the signal at the first level of quality being arranged as an array of signal elements comprising at least first and second rows of signal elements, wherein a reconstruction element in the set of reconstruction elements is associated with a respective signal element in the representation of the signal at the first level of quality; and
- reconstructing the representation of the signal at the first level of quality based at least in part on the representation of the signal at the second level of quality and the set of reconstruction elements, wherein deriving the set of data elements comprises:
  - selecting an inverse transformation matrix from a plurality of candidate inverse transformation matrices having the same dimensions as each other; and
  - performing an operation using the set of data elements and the selected inverse transformation matrix to derive the set of reconstruction elements, wherein the operation comprises multiplying the set of data elements and the selected inverse transformation matrix together.

13. The method of claim 12, the method comprising receiving data identifying the selected inverse transformation matrix from the encoder device.

14. The method of claim 12, the method comprising selecting the inverse transformation matrix based on analyzing the signal.

15. The method of claim 12, the method comprising selecting the inverse transformation matrix based on one or more attributes associated with the signal, wherein the signal is a video signal, and wherein the one or more attributes indicate whether the video signal is a progressive video signal or an interlaced video signal.

16. The method of claim 12, the method comprising:
- selecting a first inverse transformation matrix from the plurality of candidate inverse transformation matrices for use with a first part of the signal; and
- selecting a second inverse transformation matrix from the plurality of candidate inverse transformation matrices for use with a second, different part of the signal.

* * * * *